US012120127B1

(12) United States Patent
Grube et al.

(10) Patent No.: US 12,120,127 B1
(45) Date of Patent: *Oct. 15, 2024

(54) STORAGE OF DATA OBJECTS IN A STORAGE NETWORK

(71) Applicant: Pure Storage, Inc., Mountain View, CA (US)

(72) Inventors: Gary W. Grube, Barrington Hills, IL (US); Jason K. Resch, Chicago, IL (US)

(73) Assignee: Pure Storage, Inc., Santa Clara, CA (US)

( * ) Notice: Subject to any disclaimer, the term of this patent is extended or adjusted under 35 U.S.C. 154(b) by 86 days.

This patent is subject to a terminal disclaimer.

(21) Appl. No.: 17/087,786

(22) Filed: Nov. 3, 2020

Related U.S. Application Data

(63) Continuation-in-part of application No. 16/244,315, filed on Jan. 10, 2019, now Pat. No. 10,855,691,
(Continued)

(51) Int. Cl.
H04L 9/40 (2022.01)
G06F 3/06 (2006.01)
(Continued)

(52) U.S. Cl.
CPC ............ H04L 63/108 (2013.01); G06F 3/061 (2013.01); G06F 3/0619 (2013.01); G06F 3/0635 (2013.01); G06F 3/064 (2013.01); G06F 3/0659 (2013.01); G06F 3/067 (2013.01); G06F 11/00 (2013.01); G06F 11/1096 (2013.01); G06F 16/182 (2019.01); G06F 21/62 (2013.01); H04L 63/20 (2013.01); H04L 67/1097 (2013.01);
(Continued)

(58) Field of Classification Search
CPC ............ H04L 63/10–108; H04L 63/20; H04L 67/1097; G06F 16/182–1827; G06F 3/0659; G06F 3/067; G06F 21/62–629; G06F 2221/2137; G06F 2221/2141
See application file for complete search history.

(56) References Cited

U.S. PATENT DOCUMENTS 4,092,732 A 5/1978 Ouchi
5,454,101 A 9/1995 Mackay et al.
(Continued)

FOREIGN PATENT DOCUMENTS

EP 1625502 B1 * 4/2017 .......... G06F 11/2087

OTHER PUBLICATIONS

Chung; An Automatic Data Segmentation Method for 3D Measured Data Points; National Taiwan University, pp. 1-8; 1998.
(Continued)

Primary Examiner — Madhuri R Herzog
(74) Attorney, Agent, or Firm — Garlick & Markison; Timothy W. Markison; Bruce E. Stuckman

(57) ABSTRACT

A method for execution by a processing system of a storage network includes: generating encoded data slices based on a dispersed error encoding of at least one data object; receiving an access policy associated with the at least one data object; determining a timestamp corresponding to a current time; and storing the encoded data slices, an indicator of the time stamp and an indicator of the access policy in a storage unit of the storage network.

20 Claims, 14 Drawing Sheets

Related U.S. Application Data which is a continuation of application No. 15/221,731, filed on Jul. 28, 2016, now Pat. No. 10,237,281, which is a continuation-in-part of application No. 14/612,422, filed on Feb. 3, 2015, now Pat. No. 9,571,577, which is a continuation of application No. 12/886,368, filed on Sep. 20, 2010, now Pat. No. 8,990,585.

(60) Provisional application No. 61/290,757, filed on Dec. 29, 2009.

(51) Int. Cl.
| | |
|---|---|
| *G06F 11/00* | (2006.01) |
| *G06F 11/08* | (2006.01) |
| *G06F 11/10* | (2006.01) |
| *G06F 16/182* | (2019.01) |
| *G06F 21/62* | (2013.01) |
| *H04L 12/64* | (2006.01) |
| *H04L 67/1097* | (2022.01) |

(52) U.S. Cl.
CPC ...... *G06F 11/08* (2013.01); *G06F 2211/1028* (2013.01); *G06F 2221/2137* (2013.01); *G06F 2221/2141* (2013.01); *H04L 2012/6467* (2013.01)

(56) References Cited

U.S. PATENT DOCUMENTS

| | | | |
|---|---|---|---|
| 5,485,474 A | 1/1996 | Rabin | |
| 5,774,643 A | 6/1998 | Lubbers et al. | |
| 5,802,364 A | 9/1998 | Senator et al. | |
| 5,809,285 A | 9/1998 | Hilland | |
| 5,890,156 A | 3/1999 | Rekieta et al. | |
| 5,987,622 A | 11/1999 | Lo Verso et al. | |
| 5,991,414 A | 11/1999 | Garay et al. | |
| 6,012,159 A | 1/2000 | Fischer et al. | |
| 6,058,454 A | 5/2000 | Gerlach et al. | |
| 6,128,277 A | 10/2000 | Bruck et al. | |
| 6,175,571 B1 | 1/2001 | Haddock et al. | |
| 6,192,472 B1 | 2/2001 | Garay et al. | |
| 6,256,688 B1 | 7/2001 | Suetaka et al. | |
| 6,272,658 B1 | 8/2001 | Steele et al. | |
| 6,301,604 B1 | 10/2001 | Nojima | |
| 6,356,949 B1 | 3/2002 | Katsandres et al. | |
| 6,366,995 B1 | 4/2002 | Vilkov et al. | |
| 6,374,336 B1 | 4/2002 | Peters et al. | |
| 6,415,373 B1 | 7/2002 | Peters et al. | |
| 6,418,539 B1 | 7/2002 | Walker | |
| 6,449,688 B1 | 9/2002 | Peters et al. | |
| 6,567,948 B2 | 5/2003 | Steele et al. | |
| 6,571,282 B1 | 5/2003 | Bowman-Amuah | |
| 6,609,223 B1 | 8/2003 | Wolfgang | |
| 6,718,361 B1 | 4/2004 | Basani et al. | |
| 6,760,808 B2 | 7/2004 | Peters et al. | |
| 6,785,768 B2 | 8/2004 | Peters et al. | |
| 6,785,783 B2 | 8/2004 | Buckland | |
| 6,826,711 B2 | 11/2004 | Moulton et al. | |
| 6,879,596 B1 | 4/2005 | Dooply | |
| 7,003,688 B1 | 2/2006 | Pittelkow et al. | |
| 7,010,493 B2 | 3/2006 | Yamamoto et al. | |
| 7,024,451 B2 | 4/2006 | Jorgenson | |
| 7,024,609 B2 | 4/2006 | Wolfgang et al. | |
| 7,039,649 B2 | 5/2006 | Cai et al. | |
| 7,076,558 B1 * | 7/2006 | Dunn .............. | G06F 21/6218 726/28 |
| 7,080,101 B1 | 7/2006 | Watson et al. | |
| 7,103,824 B2 | 9/2006 | Halford | |
| 7,103,915 B2 | 9/2006 | Redlich et al. | |
| 7,111,115 B2 | 9/2006 | Peters et al. | |
| 7,120,933 B2 | 10/2006 | Mattsson | |
| 7,140,044 B2 | 11/2006 | Redlich et al. | |
| 7,146,644 B2 | 12/2006 | Redlich et al. | |
| 7,171,493 B2 | 1/2007 | Shu et al. | |
| 7,222,133 B1 | 5/2007 | Raipurkar et al. | |
| 7,240,236 B2 | 7/2007 | Cutts et al. | |
| 7,243,138 B1 | 7/2007 | Majkut | |
| 7,272,613 B2 | 9/2007 | Sim et al. | |
| 7,577,689 B1 * | 8/2009 | Masinter .............. | G06F 11/1464 |
| 7,636,724 B2 | 12/2009 | de la Torre et al. | |
| 8,418,233 B1 | 4/2013 | Hughes | |
| 8,635,184 B2 * | 1/2014 | Hsu ...................... | G06F 16/1748 707/610 |
| 8,990,585 B2 | 3/2015 | Grube et al. | |
| 2002/0016922 A1 | 2/2002 | Richards et al. | |
| 2002/0062422 A1 | 5/2002 | Butterworth et al. | |
| 2002/0138691 A1 * | 9/2002 | Yamamoto .............. | H04L 12/14 711/112 |
| 2002/0166079 A1 | 11/2002 | Ulrich et al. | |
| 2003/0018927 A1 | 1/2003 | Gadir et al. | |
| 2003/0037261 A1 | 2/2003 | Meffert et al. | |
| 2003/0065617 A1 | 4/2003 | Watkins et al. | |
| 2003/0084020 A1 | 5/2003 | Shu | |
| 2003/0120949 A1 | 6/2003 | Redlich et al. | |
| 2003/0212752 A1 | 11/2003 | Thunquest | |
| 2004/0024963 A1 | 2/2004 | Talagala et al. | |
| 2004/0122917 A1 | 6/2004 | Menon et al. | |
| 2004/0215998 A1 | 10/2004 | Buxton et al. | |
| 2004/0228493 A1 | 11/2004 | Ma | |
| 2005/0071657 A1 * | 3/2005 | Ryan .................... | G06F 21/6218 713/193 |
| 2005/0100022 A1 | 5/2005 | Ramprashad | |
| 2005/0114594 A1 | 5/2005 | Corbett et al. | |
| 2005/0125593 A1 | 6/2005 | Karpoff et al. | |
| 2005/0131993 A1 | 6/2005 | Fatula | |
| 2005/0132070 A1 | 6/2005 | Redlich et al. | |
| 2005/0144382 A1 | 6/2005 | Schmisseur | |
| 2005/0229069 A1 | 10/2005 | Hassner et al. | |
| 2006/0047907 A1 | 3/2006 | Shiga et al. | |
| 2006/0085413 A1 | 4/2006 | Ogawa et al. | |
| 2006/0136448 A1 | 6/2006 | Cialini et al. | |
| 2006/0156059 A1 | 7/2006 | Kitamura | |
| 2006/0224603 A1 | 10/2006 | Correll | |
| 2007/0021141 A1 * | 1/2007 | Yokota .................... | G06F 21/78 455/550.1 |
| 2007/0022087 A1 | 1/2007 | Bahar et al. | |
| 2007/0079081 A1 | 4/2007 | Gladwin et al. | |
| 2007/0079082 A1 | 4/2007 | Gladwin et al. | |
| 2007/0079083 A1 | 4/2007 | Gladwin et al. | |
| 2007/0088970 A1 | 4/2007 | Buxton et al. | |
| 2007/0157292 A1 | 7/2007 | Danner et al. | |
| 2007/0174192 A1 | 7/2007 | Gladwin et al. | |
| 2007/0192323 A1 | 8/2007 | Miller | |
| 2007/0214285 A1 | 9/2007 | Au et al. | |
| 2007/0234110 A1 | 10/2007 | Soran et al. | |
| 2007/0283167 A1 | 12/2007 | Venters et al. | |
| 2007/0300287 A1 | 12/2007 | Wynne et al. | |
| 2008/0320603 A1 | 12/2008 | Ito | |
| 2009/0007229 A1 * | 1/2009 | Stokes ................ | G06F 21/6218 726/2 |
| 2009/0094251 A1 | 4/2009 | Gladwin et al. | |
| 2009/0094318 A1 | 4/2009 | Gladwin et al. | |
| 2009/0222509 A1 * | 9/2009 | King .................... | H04L 67/1097 709/203 |
| 2010/0023524 A1 | 1/2010 | Gladwin et al. | |
| 2010/0115580 A1 | 5/2010 | Zurko et al. | |
| 2010/0332530 A1 | 12/2010 | McKelvie et al. | |
| 2011/0010514 A1 | 1/2011 | Benhase et al. | |
| 2016/0323323 A1 | 11/2016 | Yanovsky et al. | |

OTHER PUBLICATIONS

Harrison; Lightweight Directory Access Protocol (LDAP): Authentication Methods and Security Mechanisms; IETF Network Working Group; RFC 4513; Jun. 2006; pp. 1-32.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

(56) References Cited

OTHER PUBLICATIONS

Legg; Lightweight Directory Access Protocol (LDAP): Syntaxes and Matching Rules; IETF Network Working Group; RFC 4517; Jun. 2006; pp. 1-50.

Plank, T1: Erasure Codes for Storage Applications; Fast2005, 4th Usenix Conference on File Storage Technologies; Dec. 13-16, 2005; pp. 1-74.

Rabin; Efficient Dispersal of Information for Security, Load Balancing, and Fault Tolerance; Journal of the Association for Computer Machinery; vol. 36, No. 2; Apr. 1989; pp. 335-348.

Satran, et al.; Internet Small Computer Systems Interface (ISCSI); IETF Network Working Group; RFC 3720; Apr. 2004; pp. 1-257.

Sciberras; Lightweight Directory Access Protocol (LDAP): Schema for User Applications; IETF Network Working Group; RFC 4519; Jun. 2006; pp. 1-33.

Sermersheim; Lightweight Directory Access Protocol (LDAP): The Protocol; IETF Network Working Group; RFC 4511; Jun. 2006; pp. 1-68.

Shamir; How to Share a Secret; Communications of the ACM; vol. 22, No. 11; Nov. 1979; pp. 612-613.

Smith; Lightweight Directory Access Protocol (LDAP): String Representation of Search Filters; IETF Network Working Group; RFC 4515; Jun. 2006; pp. 1-12.

Smith; Lightweight Directory Access Protocol (LDAP): Uniform Resource Locator; IETF Network Working Group; RFC 4516; Jun. 2006; pp. 1-15.

Wildi; Java iSCSi Initiator; Master Thesis; Department of Computer and Information Science, University of Konstanz; Feb. 2007; 60 pgs.

Xin, et al.; Evaluation of Distributed Recovery in Large-Scale Storage Systems; 13th IEEE International Symposium on High Performance Distributed Computing; Jun. 2004; pp. 172-181.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): Directory Information Models; IETF Network Working Group; RFC 4512; Jun. 2006; pp. 1-49.

Zeilenga; Lightweight Directory Access Protocol (LDAP): Internationalized String Preparation; IETF Network Working Group; RFC 4518; Jun. 2006; pp. 1-14.

Zeilenga; Lightweight Directory Access Protocol (LDAP): String Representation of Distinguished Names; IETF Network Working Group; RFC 4514; Jun. 2006; pp. 1-15.

\* cited by examiner

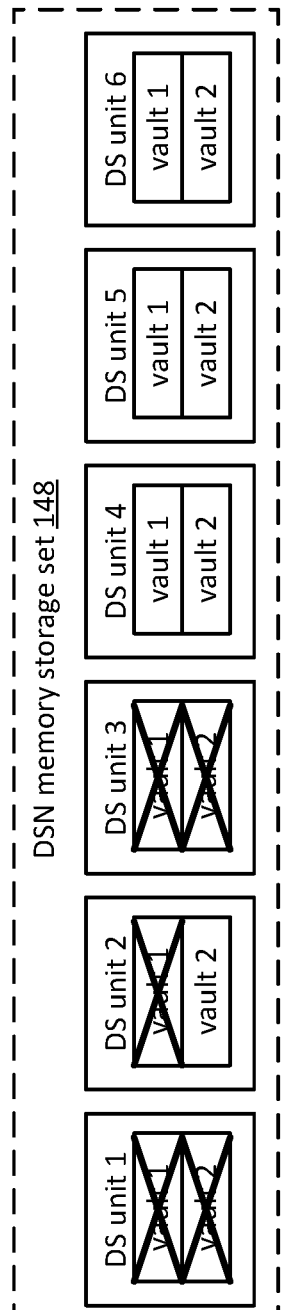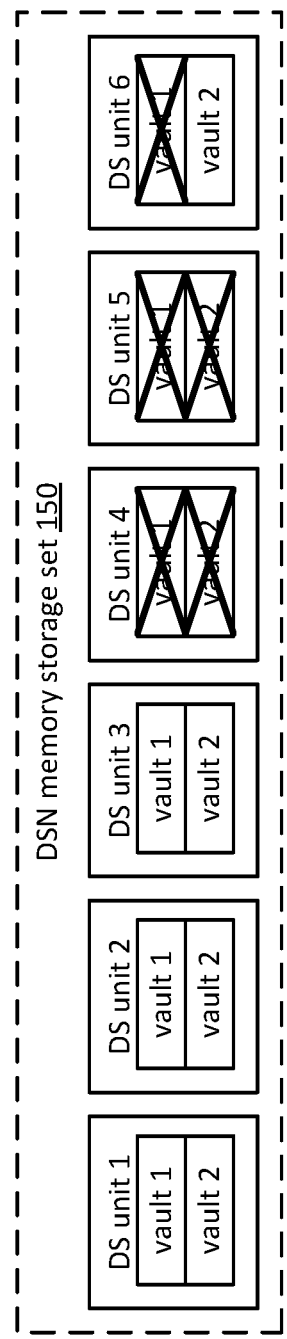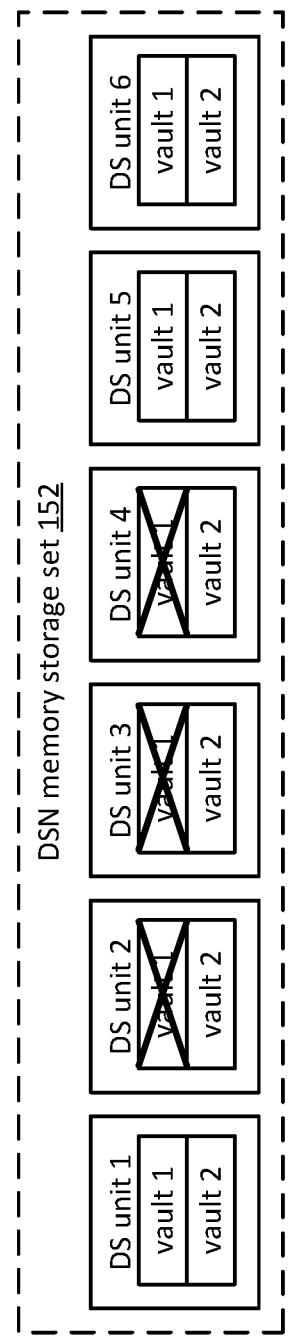

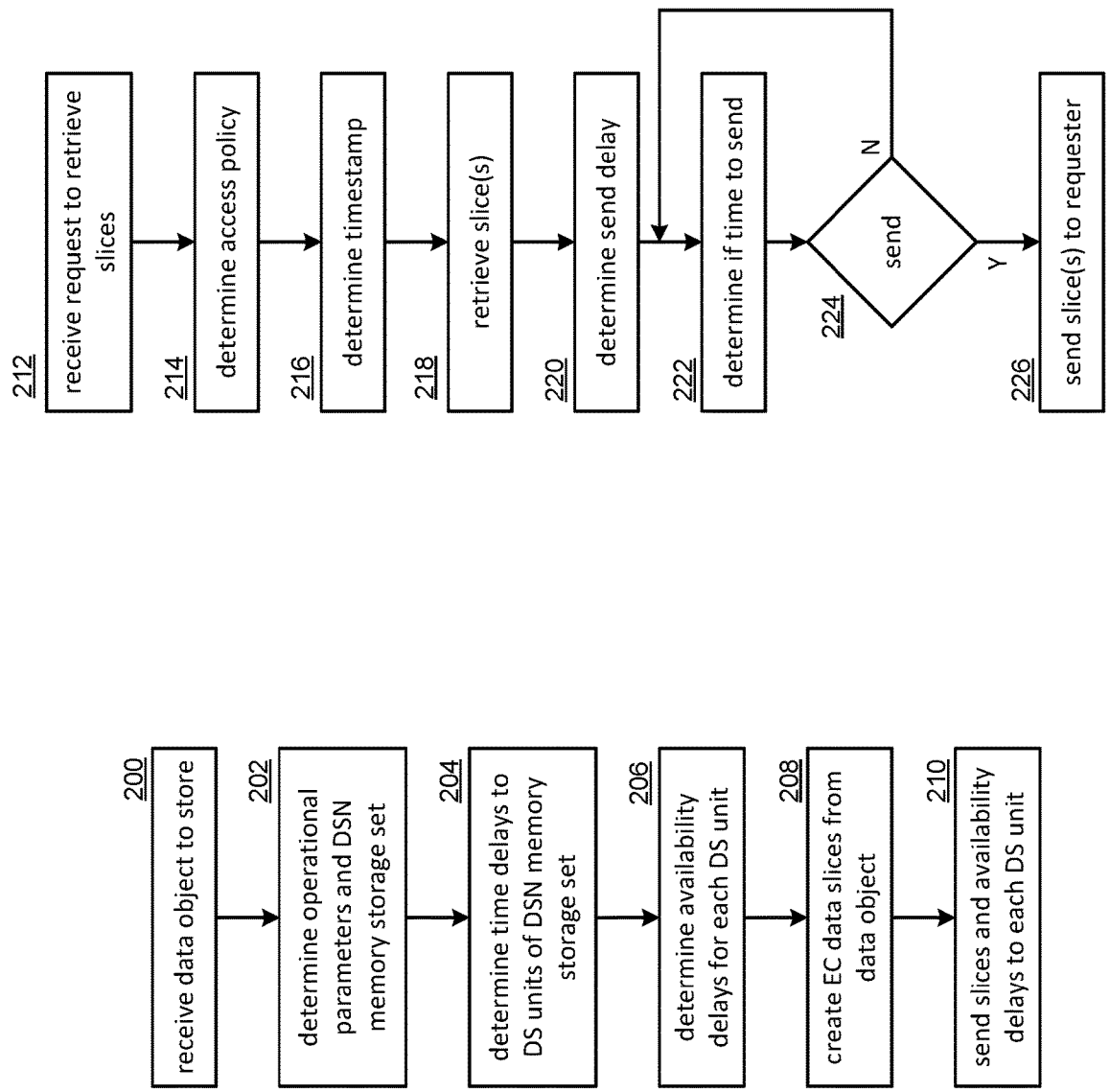

STORAGE OF DATA OBJECTS IN A STORAGE NETWORK

CROSS REFERENCE TO RELATED PATENTS

The present U.S. Utility Patent Application claims priority pursuant to 35 U.S.C. § 120 as a continuation-in-part of U.S. Utility application Ser. No. 16/244,315, entitled "ACCESS POLICY UPDATES IN A DISPERSED STORAGE NETWORK", filed Jan. 10, 2019, which is a continuation of U.S. Utility application Ser. No. 15/221,731, entitled "ACCESS POLICY UPDATES IN A DISPERSED STORAGE NETWORK", filed Jul. 28, 2016, issued as U.S. Pat. No. 10,237,281 on Mar. 19, 2019, which is a continuation-in-part of U.S. Utility application Ser. No. 14/612,422, entitled "TIME BASED DISPERSED STORAGE ACCESS", filed Feb. 3, 2015, issued as U.S. Pat. No. 9,571,577 on Feb. 14, 2017, which is a continuation of U.S. Utility application Ser. No. 12/886,368, entitled "TIME BASED DISPERSED STORAGE ACCESS", filed Sep. 20, 2010, issued as U.S. Pat. No. 8,990,585 on Mar. 24, 2015, which claims priority pursuant to 35 U.S.C. § 119(e) to U.S. Provisional Application No. 61/290,757, entitled "DISTRIBUTED STORAGE TIME SYNCHRONIZATION", filed Dec. 29, 2009, all of which are hereby incorporated herein by reference in their entirety and made part of the present U.S. Utility Patent Application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to computing systems and more particularly to data storage solutions within such computing systems.

Description of Related Art

Computers are known to communicate, process, and store data. Such computers range from wireless smart phones to data centers that support millions of web searches, stock trades, or on-line purchases every day. In general, a computing system generates data and/or manipulates data from one form into another. For instance, an image sensor of the computing system generates raw picture data and, using an image compression program (e.g., JPEG, MPEG, etc.), the computing system manipulates the raw picture data into a standardized compressed image.

With continued advances in processing speed and communication speed, computers are capable of processing real time multimedia data for applications ranging from simple voice communications to streaming high definition video. As such, general-purpose information appliances are replacing purpose-built communications devices (e.g., a telephone). For example, smart phones can support telephony communications but they are also capable of text messaging and accessing the internet to perform functions including email, web browsing, remote applications access, and media communications (e.g., telephony voice, image transfer, music files, video files, real time video streaming. etc.).

Each type of computer is constructed and operates in accordance with one or more communication, processing, and storage standards. As a result of standardization and with advances in technology, more and more information content is being converted into digital formats. For example, more digital cameras are now being sold than film cameras, thus producing more digital pictures. As another example, web-based programming is becoming an alternative to over the air television broadcasts and/or cable broadcasts. As further examples, papers, books, video entertainment, home video, etc. are now being stored digitally, which increases the demand on the storage function of computers.

A typical computer storage system includes one or more memory devices aligned with the needs of the various operational aspects of the computer's processing and communication functions. Generally, the immediacy of access dictates what type of memory device is used. For example, random access memory (RAM) memory can be accessed in any random order with a constant response time, thus it is typically used for cache memory and main memory. By contrast, memory device technologies that require physical movement such as magnetic disks, tapes, and optical discs, have a variable response time as the physical movement can take longer than the data transfer, thus they are typically used for secondary memory (e.g., hard drive, backup memory, etc.).

A computer's storage system will be compliant with one or more computer storage standards that include, but are not limited to, network file system (NFS), flash file system (FFS), disk file system (DFS), small computer system interface (SCSI), internet small computer system interface (iSCSI), file transfer protocol (FTP), and web-based distributed authoring and versioning (WebDAV). These standards specify the data storage format (e.g., files, data objects, data blocks, directories, etc.) and interfacing between the computer's processing function and its storage system, which is a primary function of the computer's memory controller.

Despite the standardization of the computer and its storage system, memory devices fail; especially commercial grade memory devices that utilize technologies incorporating physical movement (e.g., a disc drive). For example, it is fairly common for a disc drive to routinely suffer from bit level corruption and to completely fail after three years of use. One solution is to a higher-grade disc drive, which adds significant cost to a computer.

Another solution is to utilize multiple levels of redundant disc drives to replicate the data into two or more copies. One such redundant drive approach is called redundant array of independent discs (RAID). In a RAID device, a RAID controller adds parity data to the original data before storing it across the array. The parity data is calculated from the original data such that the failure of a disc will not result in the loss of the original data. For example, RAID 5 uses three discs to protect data from the failure of a single disc. The parity data, and associated redundancy overhead data, reduces the storage capacity of three independent discs by one third (e.g., n−1=capacity). RAID 6 can recover from a loss of two discs and requires a minimum of four discs with a storage capacity of n−2.

While RAID addresses the memory device failure issue, it is not without its own failures issues that affect its effectiveness, efficiency and security. For instance, as more discs are added to the array, the probability of a disc failure increases, which increases the demand for maintenance. For example, when a disc fails, it needs to be manually replaced before another disc fails and the data stored in the RAID device is lost. To reduce the risk of data loss, data on a RAID device is typically copied on to one or more other RAID devices. While this addresses the loss of data issue, it raises a security issue since multiple copies of data are available, which increases the chances of unauthorized access. Further, as the amount of data being stored grows, the overhead of RAID devices becomes a non-trivial efficiency issue.

BRIEF DESCRIPTION OF THE SEVERAL VIEWS OF THE DRAWING(S)

FIGS. 10A-10C are schematic block diagrams of embodiments of a dispersed storage network (DSN) memory storage set in accordance with the invention;

FIG. 16 is a flowchart illustrating an example of storing a data object in accordance with the invention;

FIG. 17 is another flowchart illustrating another example of retrieving encoded data slices in accordance with the invention;

DETAILED DESCRIPTION OF THE INVENTION

Figure 1:
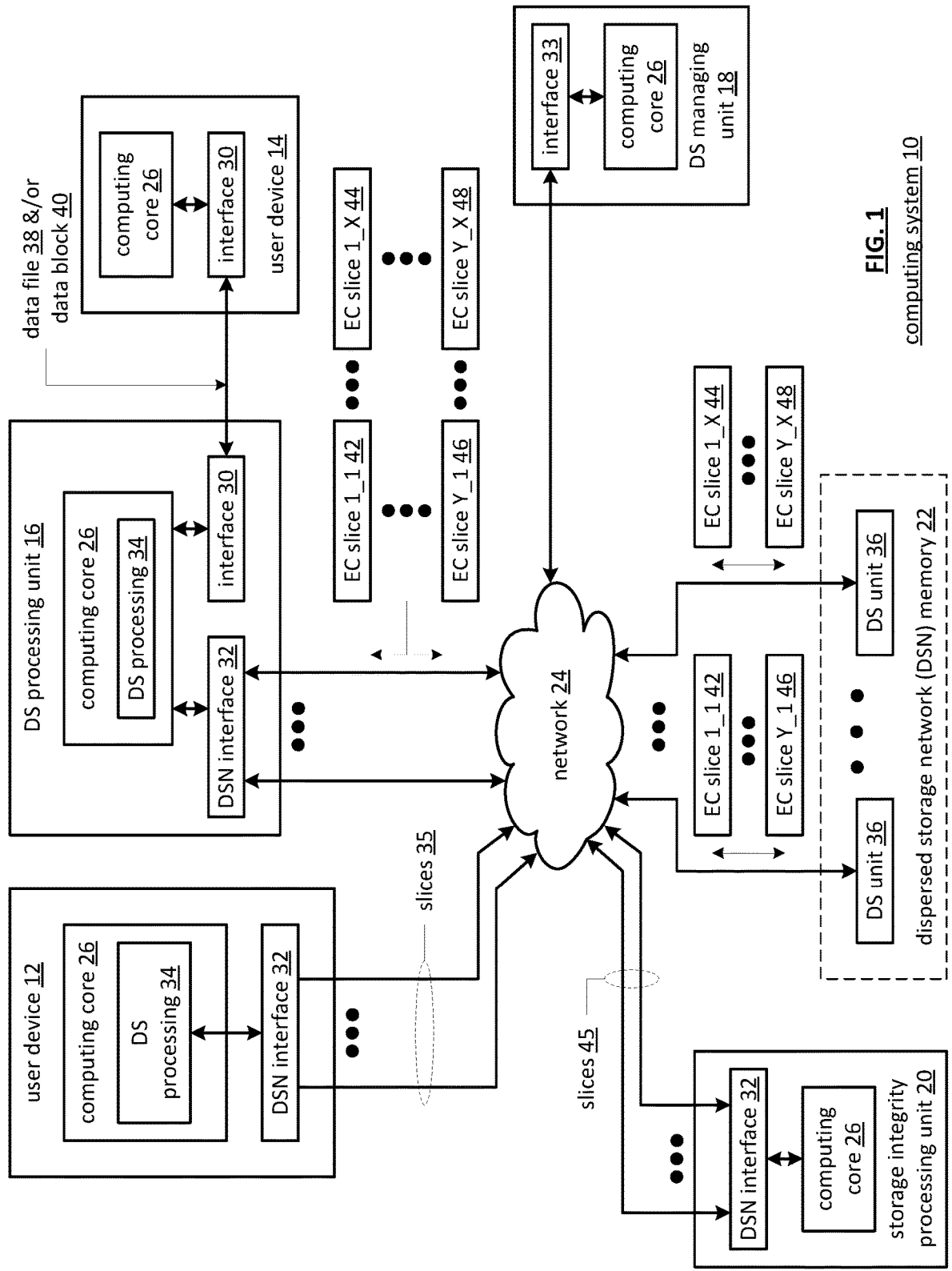
FIG. 1 is a schematic block diagram of an embodiment of a computing system in accordance with the invention.

FIG. 1 is a schematic block diagram of a computing system 10 that includes one or more of a first type of user devices 12, one or more of a second type of user devices 14, at least one distributed storage (DS) processing unit 16, at least one DS managing unit 18, at least one storage integrity processing unit 20, and a distributed storage network (DSN) memory 22 coupled via a network 24. The network 24 may include one or more wireless and/or wire lined communication systems; one or more private intranet systems and/or public internet systems; and/or one or more local area networks (LAN) and/or wide area networks (WAN).

The DSN memory 22 includes a plurality of distributed storage (DS) units 36 for storing data of the system. Each of the DS units 36 includes a processing module and memory and may be located at a geographically different site than the other DS units (e.g., one in Chicago, one in Milwaukee, etc.). The processing module may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that if the processing module includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module executes, hard coded and/or operational instructions corresponding to at least some of the steps and/or functions illustrated in FIGS. 1-20.

Each of the user devices 12-14, the DS processing unit 16, the DS managing unit 18, and the storage integrity processing unit 20 may be a portable computing device (e.g., a social networking device, a gaming device, a cell phone, a smart phone, a personal digital assistant, a digital music player, a digital video player, a laptop computer, a handheld computer, a video game controller, and/or any other portable device that includes a computing core) and/or a fixed computing device (e.g., a personal computer, a computer server, a cable set-top box, a satellite receiver, a television set, a printer, a fax machine, home entertainment equipment, a video game console, and/or any type of home or office computing equipment). Such a portable or fixed computing device includes a computing core 26 and one or more interfaces 30, 32, and/or 33. An embodiment of the computing core 26 will be described with reference to FIG. 2.

With respect to the interfaces, each of the interfaces 30, 32, and 33 includes software and/or hardware to support one or more communication links via the network 24 and/or directly. For example, interfaces 30 support a communication link (wired, wireless, direct, via a LAN, via the network 24, etc.) between the first type of user device 14 and the DS processing unit 16. As another example, DSN interface 32 supports a plurality of communication links via the network 24 between the DSN memory 22 and the DS processing unit 16, the first type of user device 12, and/or the storage integrity processing unit 20. As yet another example, interface 33 supports a communication link between the DS managing unit 18 and any one of the other devices and/or units 12, 14, 16, 20, and/or 22 via the network 24.

In general and with respect to data storage, the system 10 supports three primary functions: distributed network data storage management, distributed data storage and retrieval, and data storage integrity verification. In accordance with these three primary functions, data can be distributedly stored in a plurality of physically different locations and subsequently retrieved in a reliable and secure manner regardless of failures of individual storage devices, failures of network equipment, the duration of storage, the amount of data being stored, attempts at hacking the data, etc.

The DS managing unit 18 performs distributed network data storage management functions, which include establishing distributed data storage parameters, performing network operations, performing network administration, and/or performing network maintenance. The DS managing unit 18 establishes the distributed data storage parameters (e.g., allocation of virtual DSN memory space, distributed storage parameters, security parameters, billing information, user profile information, etc.) for one or more of the user devices 12-14 (e.g., established for individual devices, established for a user group of devices, established for public access by the user devices, etc.). For example, the DS managing unit 18 coordinates the creation of a vault (e.g., a virtual memory block) within the DSN memory 22 for a user device (for a group of devices, or for public access). The DS managing unit 18 also determines the distributed data storage parameters for the vault. In particular, the DS managing unit 18 determines a number of slices (e.g., the number that a data segment of a data file and/or data block is partitioned into for distributed storage) and a read threshold value (e.g., the minimum number of slices required to reconstruct the data segment).

As another example, the DS managing module 18 creates and stores, locally or within the DSN memory 22, user profile information. The user profile information includes one or more of authentication information, permissions, and/or the security parameters. The security parameters may include one or more of encryption/decryption scheme, one or more encryption keys, key generation scheme, and data encoding/decoding scheme.

As yet another example, the DS managing unit 18 creates billing information for a particular user, user group, vault access, public vault access, etc. For instance, the DS managing unit 18 tracks the number of times user accesses a private vault and/or public vaults, which can be used to generate a per-access bill. In another instance, the DS managing unit 18 tracks the amount of data stored and/or retrieved by a user device and/or a user group, which can be used to generate a per-data-amount bill.

The DS managing unit 18 also performs network operations, network administration, and/or network maintenance. As at least part of performing the network operations and/or administration, the DS managing unit 18 monitors performance of the devices and/or units of the system 10 for potential failures, determines the devices' and/or unit's activation status, determines the devices' and/or units' loading, and any other system level operation that affects the performance level of the system 10. For example, the DS managing unit 18 receives and aggregates network management alarms, alerts, errors, status information, performance information, and messages from the devices 12-14 and/or the units 16, 20, 22. For example, the DS managing unit 18 receives a simple network management protocol (SNMP) message regarding the status of the DS processing unit 16.

The DS managing unit 18 performs the network maintenance by identifying equipment within the system 10 that needs replacing, upgrading, repairing, and/or expanding. For example, the DS managing unit 18 determines that the DSN memory 22 needs more DS units 36 or that one or more of the DS units 36 needs updating.

The second primary function (i.e., distributed data storage and retrieval) begins and ends with a user device 12-14. For instance, if a second type of user device 14 has a data file 38 and/or data block 40 to store in the DSN memory 22, it send the data file 38 and/or data block 40 to the DS processing unit 16 via its interface 30. As will be described in greater detail with reference to FIG. 2, the interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data file 38 and/or data block 40.

The DS processing unit 16 receives the data file 38 and/or data block 40 via its interface 30 and performs a distributed storage (DS) process 34 thereon (e.g., an error coding dispersal storage function). The DS processing 34 begins by partitioning the data file 38 and/or data block 40 into one or more data segments, which is represented as Y data segments. For example, the DS processing 34 may partition the data file 38 and/or data block 40 into a fixed byte size segment (e.g., $2^1$ to $2^n$ bytes, where n=>2) or a variable byte size (e.g., change byte size from segment to segment, or from groups of segments to groups of segments, etc.).

For each of the Y data segments, the DS processing 34 error encodes (e.g., forward error correction (FEC), information dispersal algorithm, or error correction coding) and slices (or slices then error encodes) the data segment into a plurality of error coded (EC) data slices 42-48, which is represented as X slices per data segment. The number of slices (X) per segment, which corresponds to a number of pillars n, is set in accordance with the distributed data storage parameters and the error coding scheme. For example, if a Reed-Solomon (or other FEC scheme) is used in an n/k system, then a data segment is divided into n slices, where k number of slices is needed to reconstruct the original data (i.e., k is the threshold). As a few specific examples, the n/k factor may be 5/3; 6/4; 8/6; 8/5; 16/10.

For each slice 42-48, the DS processing unit 16 creates a unique slice name and appends it to the corresponding slice 42-48. The slice name includes universal DSN memory addressing routing information (e.g., virtual memory addresses in the DSN memory 22) and user-specific information (e.g., user ID, file name, data block identifier, etc.).

The DS processing unit 16 transmits the plurality of EC slices 42-48 to a plurality of DS units 36 of the DSN memory 22 via the DSN interface 32 and the network 24. The DSN interface 32 formats each of the slices for transmission via the network 24. For example, the DSN interface 32 may utilize an internet protocol (e.g., TCP/IP, etc.) to packetize the slices 42-48 for transmission via the network 24.

The number of DS units 36 receiving the slices 42-48 is dependent on the distributed data storage parameters established by the DS managing unit 18. For example, the DS managing unit 18 may indicate that each slice is to be stored in a different DS unit 36. As another example, the DS managing unit 18 may indicate that like slice numbers of different data segments are to be stored in the same DS unit 36. For example, the first slice of each of the data segments is to be stored in a first DS unit 36, the second slice of each of the data segments is to be stored in a second DS unit 36, etc. In this manner, the data is encoded and distributedly stored at physically diverse locations to improved data storage integrity and security. Further examples of encoding the data segments will be provided with reference to one or more of FIGS. 2-20.

Each DS unit 36 that receives a slice 42-48 for storage translates the virtual DSN memory address of the slice into a local physical address for storage. Accordingly, each DS unit 36 maintains a virtual to physical memory mapping to assist in the storage and retrieval of data.

The first type of user device 12 performs a similar function to store data in the DSN memory 22 with the exception that it includes the DS processing. As such, the device 12 encodes and slices the data file and/or data block it has to store. The device then transmits the slices 11 to the DSN memory via its DSN interface 32 and the network 24.

For a second type of user device 14 to retrieve a data file or data block from memory, it issues a read command via its interface 30 to the DS processing unit 16. The DS processing unit 16 performs the DS processing 34 to identify the DS units 36 storing the slices of the data file and/or data block based on the read command. The DS processing unit 16 may also communicate with the DS managing unit 18 to verify that the user device 14 is authorized to access the requested data.

Assuming that the user device is authorized to access the requested data, the DS processing unit 16 issues slice read commands to at least a threshold number of the DS units 36 storing the requested data (e.g., to at least 10 DS units for a 16/10 error coding scheme). Each of the DS units 36 receiving the slice read command, verifies the command, accesses its virtual to physical memory mapping, retrieves the requested slice, or slices, and transmits it to the DS processing unit 16.

Once the DS processing unit 16 has received a read threshold number of slices for a data segment, it performs an error decoding function and de-slicing to reconstruct the data segment. When Y number of data segments has been reconstructed, the DS processing unit 16 provides the data file 38 and/or data block 40 to the user device 14. Note that the first type of user device 12 performs a similar process to retrieve a data file and/or data block.

The storage integrity processing unit 20 performs the third primary function of data storage integrity verification. In general, the storage integrity processing unit 20 periodically retrieves slices 45, and/or slice names, of a data file or data block of a user device to verify that one or more slices have not been corrupted or lost (e.g., the DS unit failed). The retrieval process mimics the read process previously described.

If the storage integrity processing unit 20 determines that one or more slices is corrupted or lost, it rebuilds the corrupted or lost slice(s) in accordance with the error coding scheme. The storage integrity processing unit 20 stores the rebuild slice, or slices, in the appropriate DS unit(s) 36 in a manner that mimics the write process previously described.

Figure 2:
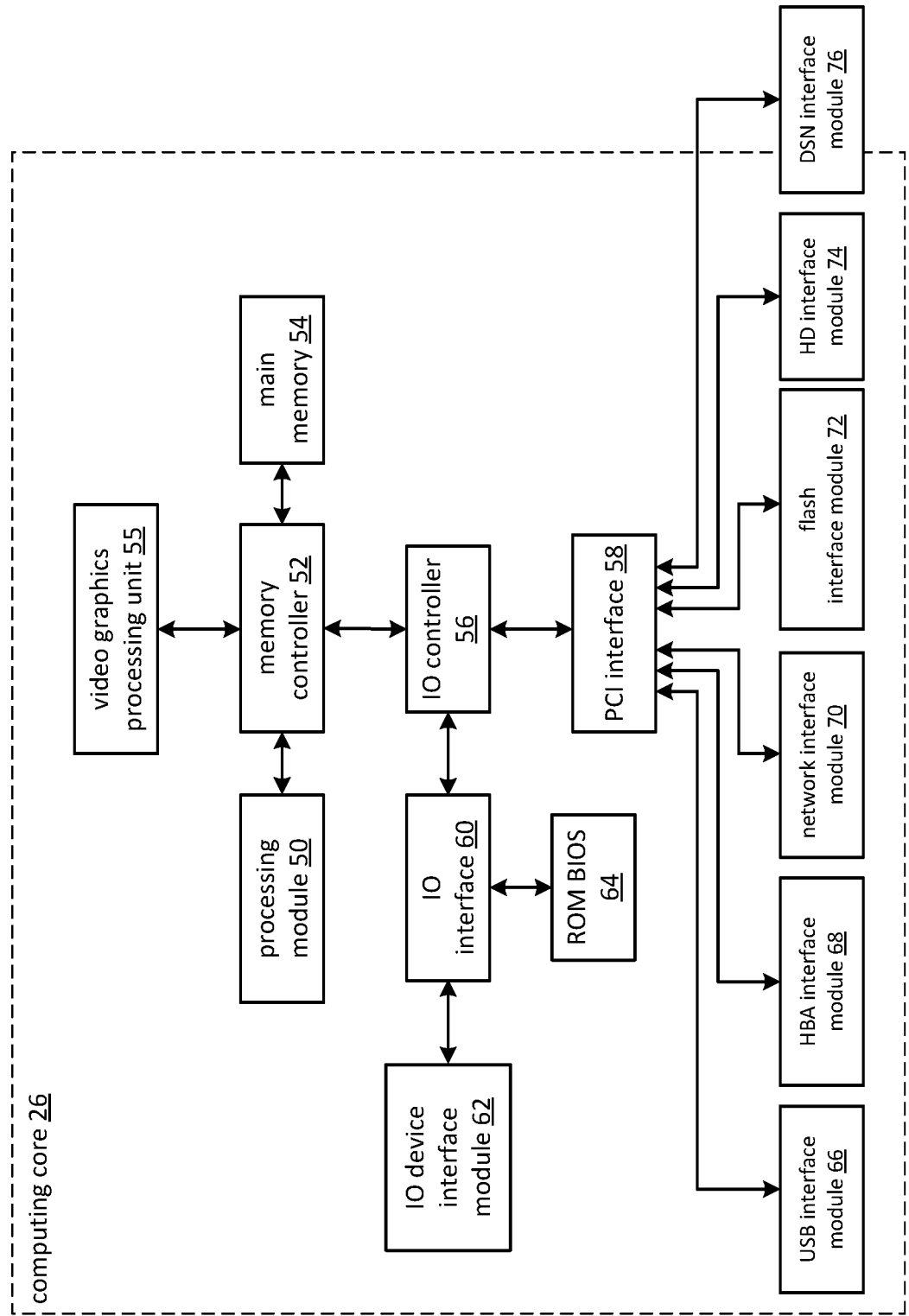
FIG. 2 is a schematic block diagram of an embodiment of a computing core in accordance with the invention.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, at least one IO device interface module 62, a read only memory (ROM) basic input output system (BIOS) 64, and one or more memory interface modules. The memory interface module(s) includes one or more of a universal serial bus (USB) interface module 66, a host bus adapter (HBA) interface module 68, a network interface module 70, a flash interface module 72, a hard drive interface module 74, and a DSN interface module 76. Note the DSN interface module 76 and/or the network interface module 70 may function as the interface 30 of the user device 14 of FIG. 1. Further note that the IO device interface module 62 and/or the memory interface modules may be collectively or individually referred to as IO ports.

The processing module 50 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module 50 may have an associated memory and/or memory element, which may be a single memory device, a plurality of memory devices, and/or embedded circuitry of the processing module 50. Such a memory device may be a read-only memory, random access memory, volatile memory, non-volatile memory, static memory, dynamic memory, flash memory, cache memory, and/or any device that stores digital information. Note that if the processing module 50 includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module 50 implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module 50 executes, hard coded and/or operational instructions corresponding to at least some of the steps and/or functions illustrated in FIGS. 1-20.

Figure 3:
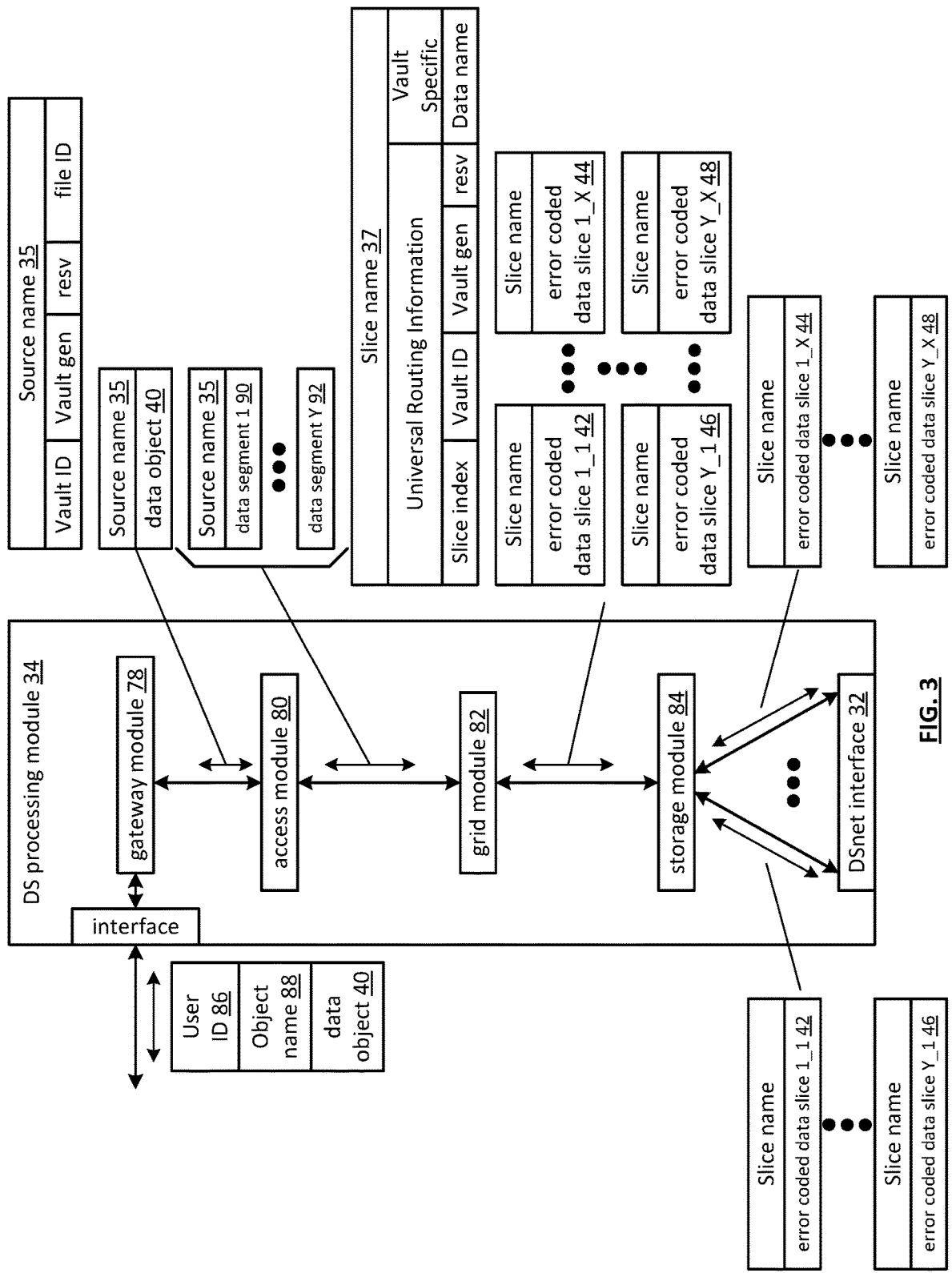
FIG. 3 is a schematic block diagram of an embodiment of a distributed storage processing unit in accordance with the invention.

FIG. 3 is a schematic block diagram of an embodiment of a dispersed storage (DS) processing module 34 of user device 12 and/or of the DS processing unit 16. The DS processing module 34 includes a gateway module 78, an access module 80, a grid module 82, and a storage module 84. The DS processing module 34 may also include an interface 30 and the DSnet interface 32 or the interfaces 68 and/or 70 may be part of user 12 or of the DS processing unit 14. The DS processing module 34 may further include a bypass/feedback path between the storage module 84 to the gateway module 78. Note that the modules 78-84 of the DS processing module 34 may be in a single unit or distributed across multiple units.

In an example of storing data, the gateway module 78 receives an incoming data object that includes a user ID field 86, an object name field 88, and the data field 40 and may also receive corresponding information that includes a process identifier (e.g., an internal process/application ID), metadata, a file system directory, a block number, a transaction message, a user device identity (ID), a data object identifier, a source name, and/or user information. The gateway module 78 authenticates the user associated with the data object by verifying the user ID 86 with the managing unit 18 and/or another authenticating unit.

When the user is authenticated, the gateway module 78 obtains user information from the management unit 18, the user device, and/or the other authenticating unit. The user information includes a vault identifier, operational parameters, and user attributes (e.g., user data, billing information, etc.). A vault identifier identifies a vault, which is a virtual memory space that maps to a set of DS storage units 36. For example, vault 1 (i.e., user 1's DSN memory space) includes eight DS storage units (X=8 wide) and vault 2 (i.e., user 2's DSN memory space) includes sixteen DS storage units (X=16 wide). The operational parameters may include an error coding algorithm, the width n (number of pillars X or slices per segment for this vault), a read threshold T, a write threshold, an encryption algorithm, a slicing parameter, a compression algorithm, an integrity check method, caching settings, parallelism settings, and/or other parameters that may be used to access the DSN memory layer.

The gateway module 78 uses the user information to assign a source name 35 to the data. For instance, the gateway module 60 determines the source name 35 of the data object 40 based on the vault identifier and the data object. For example, the source name may contain a file identifier (ID), a vault generation number, a reserved field, and a vault identifier (ID). As another example, the gateway module 78 may generate the file ID based on a hash function of the data object 40. Note that the gateway module 78 may also perform message conversion, protocol conversion, electrical conversion, optical conversion, access control, user identification, user information retrieval, traffic monitoring, statistics generation, configuration, management, and/or source name determination.

The access module 80 receives the data object 40 and creates a series of data segments 1 through Y 90-92 in accordance with a data storage protocol (e.g., file storage system, a block storage system, and/or an aggregated block storage system). The number of segments Y may be chosen or randomly assigned based on a selected segment size and the size of the data object. For example, if the number of segments is chosen to be a fixed number, then the size of the segments varies as a function of the size of the data object. For instance, if the data object is an image file of 4,194,304 eight bit bytes (e.g., 33,554,432 bits) and the number of segments Y=131,072, then each segment is 256 bits or 32 bytes. As another example, if segment sized is fixed, then the number of segments Y varies based on the size of data object. For instance, if the data object is an image file of 4,194,304 bytes and the fixed size of each segment is 4,096 bytes, the then number of segments Y=1,024. Note that each segment is associated with the same source name.

The grid module 82 receives the data segments and may manipulate (e.g., compression, encryption, cyclic redundancy check (CRC), etc.) each of the data segments before performing an error coding function of the error coding dispersal storage function to produce a pre-manipulated data segment. After manipulating a data segment, if applicable, the grid module 82 error encodes (e.g., Reed-Solomon, Convolution encoding, Trellis encoding, etc.) the data segment or manipulated data segment into X error coded data slices 42-44.

The value X, or the number of pillars (e.g., X=16), is chosen as a parameter of the error coding dispersal storage function. Other parameters of the error coding dispersal function include a read threshold T, a write threshold W, etc. The read threshold (e.g., T=10, when X=16) corresponds to the minimum number of error-free error coded data slices required to reconstruct the data segment. In other words, the DS processing module 34 can compensate for X−T (e.g., 16−10=6) missing error coded data slices per data segment. The write threshold W corresponds to a minimum number of DS storage units that acknowledge proper storage of their respective data slices before the DS processing module indicates proper storage of the encoded data segment. Note that the write threshold is greater than or equal to the read threshold for a given number of pillars (X).

For each data slice of a data segment, the grid module 82 generates a unique slice name 37 and attaches it thereto. The slice name 37 includes a universal routing information field and a vault specific field and may be 48 bytes (e.g., 24 bytes for each of the universal routing information field and the vault specific field). As illustrated, the universal routing information field includes a slice index, a vault ID, a vault generation, and a reserved field. The slice index is based on the pillar number and the vault ID and, as such, is unique for each pillar (e.g., slices of the same pillar for the same vault for any segment will share the same slice index). The vault specific field includes a data name, which includes a file ID and a segment number (e.g., a sequential numbering of data segments 1-Y of a simple data object or a data block number).

Prior to outputting the error coded data slices of a data segment, the grid module may perform post-slice manipulation on the slices. If enabled, the manipulation includes slice level compression, encryption, CRC, addressing, tagging, and/or other manipulation to improve the effectiveness of the computing system.

When the error coded data slices of a data segment are ready to be outputted, the grid module 82 determines which of the DS storage units 36 will store the EC data slices based on a dispersed storage memory mapping associated with the user's vault and/or DS storage unit attributes. The DS storage unit attributes may include availability, self-selection, performance history, link speed, link latency, ownership, available DSN memory, domain, cost, a prioritization scheme, a centralized selection message from another source, a lookup table, data ownership, and/or any other factor to optimize the operation of the computing system. Note that the number of DS storage units 36 is equal to or greater than the number of pillars (e.g., X) so that no more than one error coded data slice of the same data segment is stored on the same DS storage unit 36. Further note that EC data slices of the same pillar number but of different segments (e.g., EC data slice 1 of data segment 1 and EC data slice 1 of data segment 2) may be stored on the same or different DS storage units 36.

The storage module 84 performs an integrity check on the outbound encoded data slices and, when successful, identifies a plurality of DS storage units based on information provided by the grid module 82. The storage module 84 then outputs the encoded data slices 1 through X of each segment 1 through Y to the DS storage units 36. Each of the DS storage units 36 stores its EC data slice(s) and maintains a local virtual DSN address to physical location table to convert the virtual DSN address of the EC data slice(s) into physical storage addresses.

In an example of a read operation, the user device 12 and/or 14 sends a read request to the DS processing unit 14, which authenticates the request. When the request is authentic, the DS processing unit 14 sends a read message to each of the DS storage units 36 storing slices of the data object being read. The slices are received via the DSnet interface 32 and processed by the storage module 84, which performs a parity check and provides the slices to the grid module 82 when the parity check was successful. The grid module 82 decodes the slices in accordance with the error coding dispersal storage function to reconstruct the data segment. The access module 80 reconstructs the data object from the data segments and the gateway module 78 formats the data object for transmission to the user device.

Figure 4:
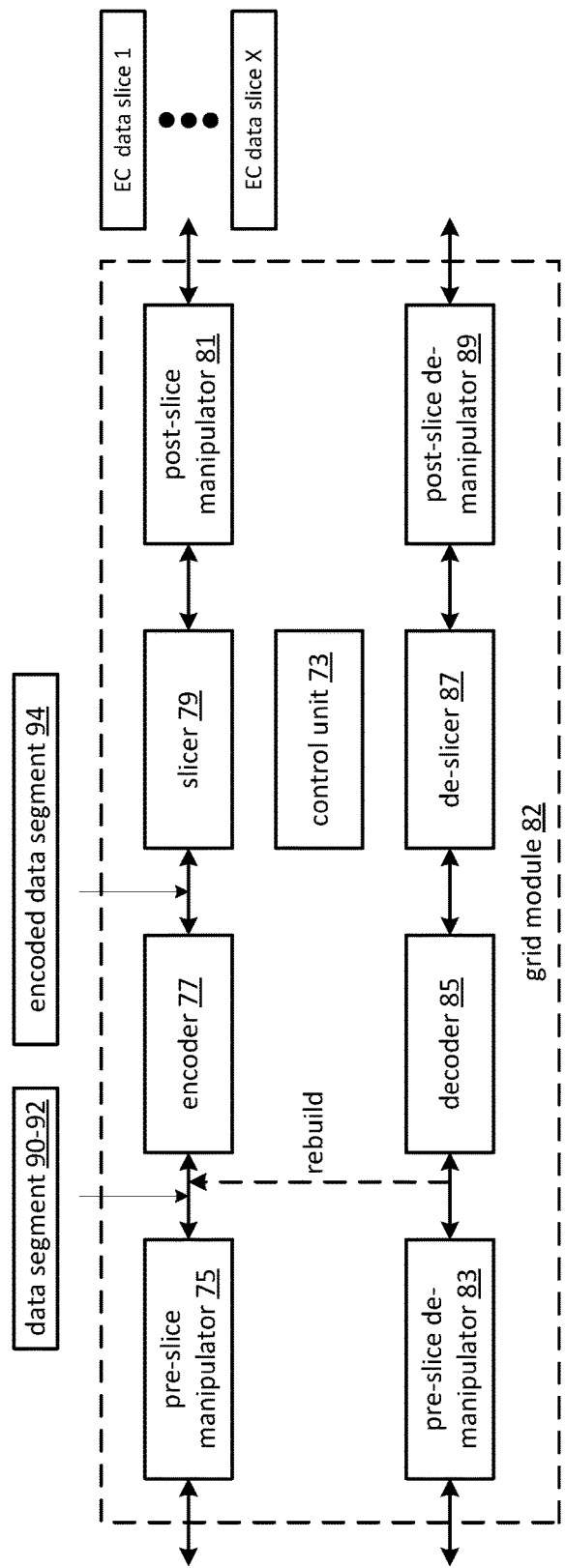
FIG. 4 is a schematic block diagram of an embodiment of a grid module in accordance with the invention.

FIG. 4 is a schematic block diagram of an embodiment of a grid module 82 that includes a control unit 73, a pre-slice manipulator 75, an encoder 77, a slicer 79, a post-slice manipulator 81, a pre-slice de-manipulator 83, a decoder 85, a de-slicer 87, and/or a post-slice de-manipulator 89. Note that the control unit 73 may be partially or completely external to the grid module 82. For example, the control unit 73 may be part of the computing core at a remote location, part of a user device, part of the DS managing unit 18, or distributed amongst one or more DS storage units.

In an example of write operation, the pre-slice manipulator 75 receives a data segment 90-92 and a write instruction from an authorized user device. The pre-slice manipulator 75 determines if pre-manipulation of the data segment 90-92 is required and, if so, what type. The pre-slice manipulator 75 may make the determination independently or based on instructions from the control unit 73, where the determination is based on a computing system-wide predetermination, a table lookup, vault parameters associated with the user identification, the type of data, security requirements, available DSN memory, performance requirements, and/or other metadata.

Once a positive determination is made, the pre-slice manipulator 75 manipulates the data segment 90-92 in accordance with the type of manipulation. For example, the type of manipulation may be compression (e.g., Lempel-Ziv-Welch, Huffman, Golomb, fractal, wavelet, etc.), signatures (e.g., Digital Signature Algorithm (DSA), Elliptic Curve DSA, Secure Hash Algorithm, etc.), watermarking, tagging, encryption (e.g., Data Encryption Standard, Advanced Encryption Standard, etc.), adding metadata (e.g., time/date stamping, user information, file type, etc.), cyclic redundancy check (e.g., CRC32), and/or other data manipulations to produce the pre-manipulated data segment.

The encoder 77 encodes the pre-manipulated data segment 92 using a forward error correction (FEC) encoder (and/or other type of erasure coding and/or error coding) to produce an encoded data segment 94. The encoder 77 determines which forward error correction algorithm to use based on a predetermination associated with the user's vault, a time based algorithm, user direction, DS managing unit direction, control unit direction, as a function of the data type, as a function of the data segment 92 metadata, and/or any other factor to determine algorithm type. The forward error correction algorithm may be Golay, Multidimensional parity, Reed-Solomon, Hamming, Bose Ray Chauduri Hocquenghem (BCH), Cauchy-Reed-Solomon, or any other FEC encoder. Note that the encoder 77 may use a different encoding algorithm for each data segment 92, the same encoding algorithm for the data segments 92 of a data object, or a combination thereof.

The encoded data segment 94 is of greater size than the data segment 92 by the overhead rate of the encoding algorithm by a factor of X/T, where X is the width or number of slices, and T is the read threshold. In this regard, the corresponding decoding process can accommodate at most X-T missing EC data slices and still recreate the data segment 92. For example, if X=16 and T=10, then the data segment 92 will be recoverable as long as 10 or more EC data slices per segment are not corrupted.

The slicer 79 transforms the encoded data segment 94 into EC data slices in accordance with the slicing parameter from the vault for this user and/or data segment 92. For example, if the slicing parameter is X=16, then the slicer 79 slices each encoded data segment 94 into 16 encoded slices.

The post-slice manipulator 81 performs, if enabled, post-manipulation on the encoded slices to produce the EC data slices. If enabled, the post-slice manipulator 81 determines the type of post-manipulation, which may be based on a computing system-wide predetermination, parameters in the vault for this user, a table lookup, the user identification, the type of data, security requirements, available DSN memory, performance requirements, control unit directed, and/or other metadata. Note that the type of post-slice manipulation may include slice level compression, signatures, encryption, CRC, addressing, watermarking, tagging, adding metadata, and/or other manipulation to improve the effectiveness of the computing system.

In an example of a read operation, the post-slice de-manipulator 89 receives at least a read threshold number of EC data slices and performs the inverse function of the post-slice manipulator 81 to produce a plurality of encoded slices. The de-slicer 87 de-slices the encoded slices to produce an encoded data segment 94. The decoder 85 performs the inverse function of the encoder 77 to recapture the data segment 90-92. The pre-slice de-manipulator 83 performs the inverse function of the pre-slice manipulator 75 to recapture the data segment 90-92.

Figure 5:
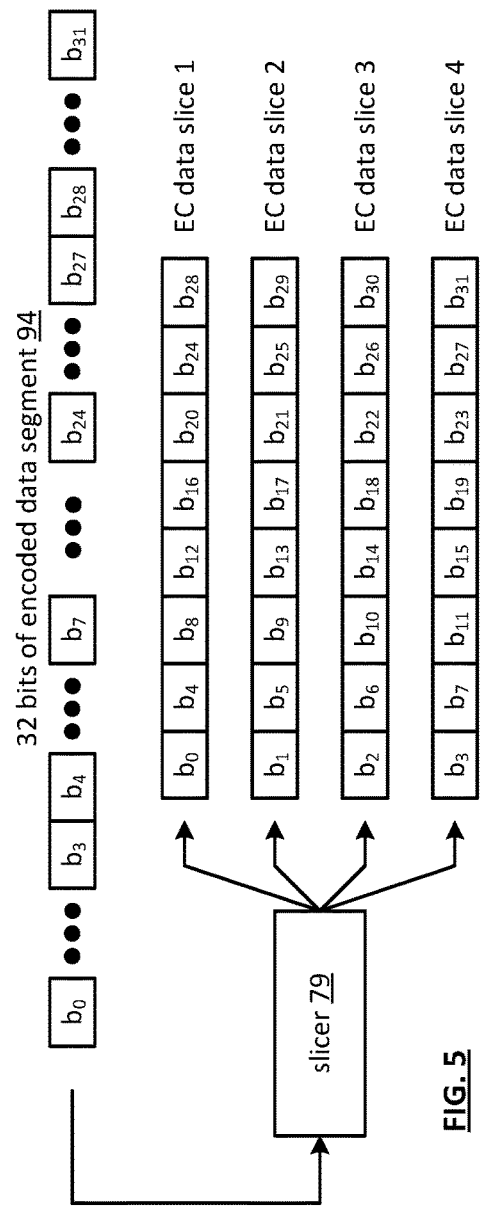
FIG. 5 is a diagram of an example embodiment of error coded data slice creation in accordance with the invention.

FIG. 5 is a diagram of an example of slicing an encoded data segment 94 by the slicer 79. In this example, the encoded data segment 94 includes thirty-two bits, but may include more or less bits. The slicer 79 disperses the bits of the encoded data segment 94 across the EC data slices in a pattern as shown. As such, each EC data slice does not include consecutive bits of the data segment 94 reducing the impact of consecutive bit failures on data recovery. For example, if EC data slice 2 (which includes bits 1, 5, 9, 13, 17, 25, and 29) is unavailable (e.g., lost, inaccessible, or corrupted), the data segment can be reconstructed from the other EC data slices (e.g., 1, 3 and 4 for a read threshold of 3 and a width of 4).

Figure 6:
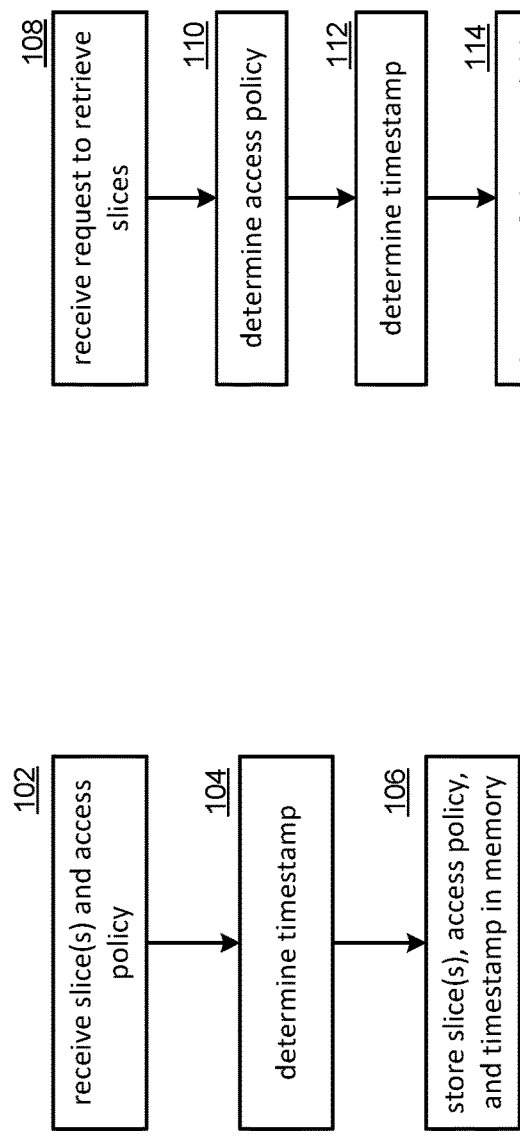
FIG. 6 is a flowchart illustrating an example of storing encoded data slices in accordance with the invention.

FIG. 6 is a flowchart illustrating an example of storing encoded data slices. The method begins at step 102 where a processing module (e.g., of a dispersed storage (DS) unit) receives slice(s), slice names, and/or an access policy from any one of a user device, a DS processing unit, a storage integrity processing unit, a DS managing unit, and another DS unit. The access policy may include a time varying availability pattern of a DS unit, a pillar, and/or a vault. For example, the pattern indicates that vault 1 is available to any user from noon to midnight every day and is not available from midnight to noon. In another example, the pattern indicates that pillar 2 of vault 3 is available to any user from noon to midnight every day and is not available from midnight to noon. In another example, the pattern indicates that pillar 2 of vault 3 is available only to user 5 from noon to midnight every day and is available to the DS managing unit 24 hours a day. Note that the access policy may be previously determined by any one or more of the user device, the DS processing unit, the storage integrity processing unit, the DS managing unit, and another DS unit. The access policy determination is discussed in greater detail with reference to FIGS. 9-11.

At step 104, the processing module determines a current timestamp based on a time function of an associated computing core 26 or of the computing system. For example, when the slices and/or the access policy are received, the processing module determines a current time (e.g., 10:14:53 AM GMT) from a shared clock source (e.g., Unix time clock, POSIX time clock, etc.) and uses the current time for the timestamp. At step 106, the processing module coordinates storage of the slices, slice names, access policy, and timestamp in a memory (e.g., a local memory associated with a DS unit). In an example, the processing module stores the slices in a main slice memory and the slice names, access policy, and timestamp in a local virtual DSN address to physical location table record such that each is linked to the other for subsequent simultaneous retrieval.

Figure 7:
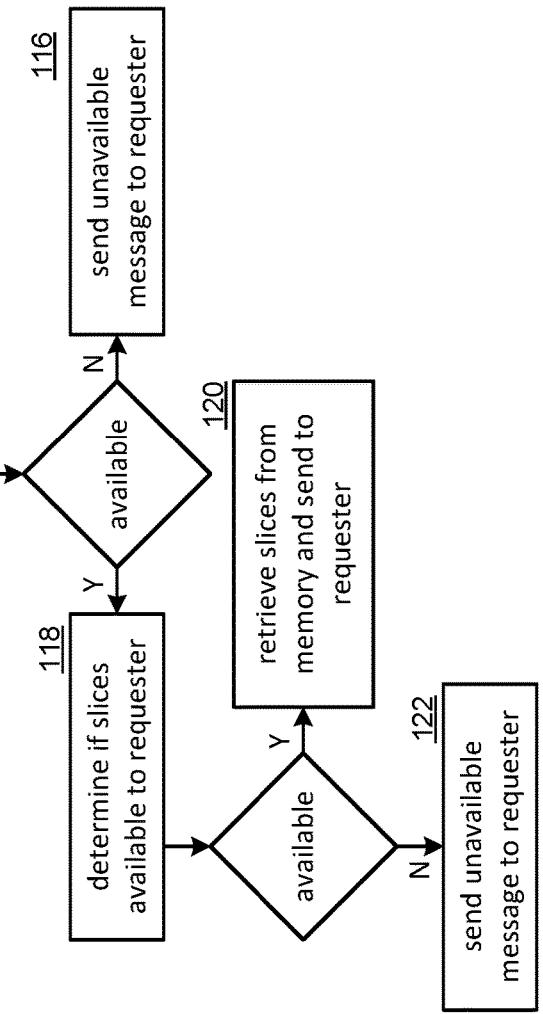
FIG. 7 is a flowchart illustrating an example of retrieving encoded data slices in accordance with the invention.

FIG. 7 is a flowchart illustrating an example of retrieving encoded data slices. The method begins with step 108 where the processing module (e.g., of a dispersed storage (DS) unit) receives a slice retrieval request from a requester, which may be a user device, a DS processing unit, a storage integrity processing unit, a DS managing unit, and/or another DS unit. The request may include one or more of a slice name(s), a requester ID, a command, an access policy update, a data object ID, a source name, a data type, a data size indicator, a priority indicator, a security indicator, and a performance indicator.

At step 110, the processing module determines an access policy to apply to the retrieval request based on one or more of a lookup in memory of a previously received access policy, the slice name(s), the requester ID, a command, an access policy update, a data object ID, a source name, a data type, a data size indicator, a priority indicator, a security indicator, and performance indicator. For example, the processing module determines the access policy based on the stored access policy associated with the slice names.

At step 112, the processing module determines a timestamp for the receiving of the request. At step 114, the processing module determines if slice(s) are available based on one or more of the access policy, the timestamp, a memory status indicator, a DS unit status indicator, and a performance indicator. In an example, the processing module determines that the slices are currently unavailable when the access policy pattern indicates that no user and/or unit currently has access authorization. In another example, the processing module determines that the slices are currently available when the access policy pattern indicates that at least one user and/or at least one unit currently has access authorization. The method branches to step 118 when the processing module determines that slice(s) are available. The method ends with step 116 when the DS unit determines that slice(s) are not available. At step 116, the processing module sends an unavailable message to the requester such that the requester may try again later or give up.

At step 118, the processing module determines if slice(s) are available to the requester. Such a determination based may be based on one or more of the access policy, the timestamp, a memory status indicator, a DS unit status indicator, and a performance indicator. For example, the processing module determines that the slices are available to the requester when the user ID associated with the requester is listed in the access policy pattern for the current timestamp. The method branches to step 122 when the processing module determines that the slice(s) are not available to the requester. The method continues to step 120 when the processing module determines that slice(s) are available. At step 120, the processing module retrieves the slice(s) from memory and sends the slice(s) to the requester. At step 122, the processing module sends an unavailable message to the requester when the DS unit determines that the slice(s) are not available to the requester.

Figure 8:
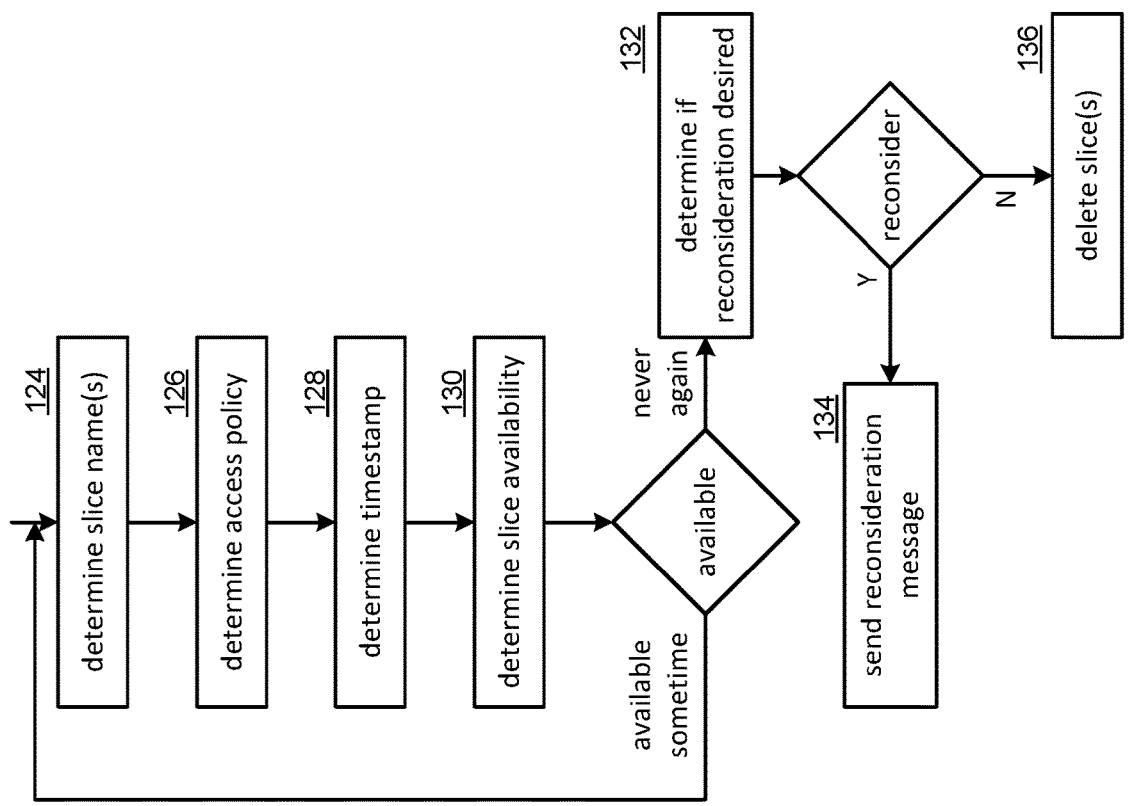
FIG. 8 is a flowchart illustrating an example of deleting encoded data slices in accordance with the invention.

FIG. 8 is a flowchart illustrating an example of deleting encoded data slices. The method begins at step 124 where a processing module (e.g., of one of a DS unit, a DS processing unit, a storage integrity processing unit, the DS managing unit and/or a user device) determines one or more slice names of slices to consider for deletion. Note that the one or more slice names may include discrete and non-contiguous slice names and/or a contiguous range (e.g., that are associated with the same data segment and/or same data object). Such a determination may be based on one or more of where a deletion process left off last time, a starting DSN address, a lookup, a command, a request, a random number, a vault ID, a data object ID, and a local virtual DSN address to physical location table.

At step 126, the processing module determines an access policy (e.g., who can access the slice and/or when) based on one or more of a stored access policy for the slice names (e.g., the policy saved when the slice was saved in the DS unit memory), a command, a request, a predetermination, and a DS managing unit message. At step 128, the processing module determines the current timestamp.

At step 130, the processing module determines slice availability (e.g., will the slice(s) ever be available again, now, or in the future) based on one or more of the access policy, the timestamp, a command, a request, a predetermination, the requester, and a DS managing unit message. In an example, the processing module determines that the slice(s) will be available sometime when the access policy indicates that the slice(s) are available to the DS managing unit a month from the present time. If this is the case, the method repeats at step 124.

If, however, the processing module determines that the slice(s) will be never again be available for a particular user (or set of users) based on the access policy indicating that the slice(s) are no longer available to the user device(s), the method continues at step 132. At step 132, the processing module determines if reconsideration of availability to the user (or set of users) is desired. For instance, the processing module determines whether a potential access policy change is contemplated and/or implemented. Such a determination may be based on one or more of the current access policy, a reconsideration time window, a user device ID, a vault lookup, a command, a predetermination, a DS managing unit message, and the current timestamp. In an example, the processing module determines to reconsider when the access policy indicates that a reconsideration may be requested within seven days of the last time the slice transitioned from available to unavailable and that transition occurred two days ago. In another example, the processing module determines to not reconsider when the access policy indicates that reconsideration may never be requested. If reconsideration is denied, the method continues to step 136 where the processing module deletes the slice(s) from the memory or moves the slices to an archive storage that is not accessible to the user (or set of users).

If reconsideration is determined, the method continues at step 134 where the processing module sends, via an interface, a reconsideration request message to one or more of the DS unit, the DS processing, the storage integrity processing unit, the DS managing unit, and the user device. The message may include any one or more of the DS unit ID, the slice name(s), a command, and the access policy. In response, the processing module may subsequently receive a reconsideration request response message that includes either a denial message or a new access policy. The processing module saves the new access policy and utilizes the new access policy for the slice(s) when the reconsideration request response message contains a new access policy.

Figure 9:
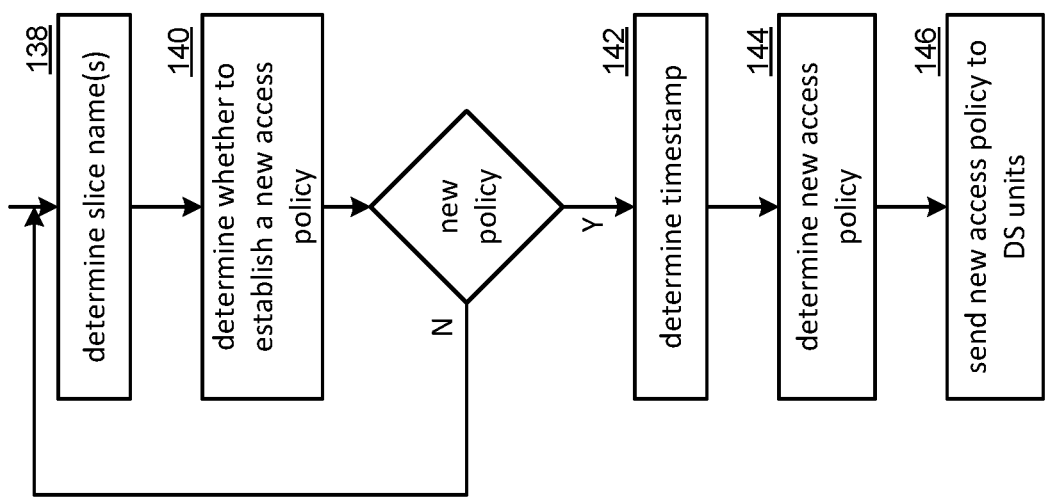
FIG. 9 is a flowchart illustrating an example of updating an access policy in accordance with the invention.

FIG. 9 is a flowchart illustrating an example of updating an access policy. The method begins with step 138 where a processing module (e.g., of one of a DS processing unit, a DS unit, a storage integrity processing unit, a DS managing unit and/or a user device) determines one or more slice names of slices to consider for an access policy update. Note that the one or more slice names may include discrete and non-contiguous slice names and/or a contiguous range (e.g., that are associated with the same data segment and/or same data object). Such a determination may be based on one or more of an access policy reconsideration request, where a process left off last time, a starting DSN address, a lookup, a command, a request, a random number, a vault ID, a data object ID, and/or a virtual DSN address to physical location table.

At step 140, the processing module determines whether to establish a new access policy (e.g., who can access the slice and/or when the slices can be accessed) based on one or more of an access policy reconsideration request (e.g., from a DS unit), a current access policy for the slice names, a command, a past history of access policy reconsiderations, a history of slice access sequences, a request, a predetermination, a data type, a security indicator, a priority indicator, a DSN memory system status indicator, a vault utilization indicator, and a DS managing unit message. In an example, the processing module determines to establish a new access policy when an access policy reconsideration request is received from a DS unit and the history of slice access sequences indicates a continued level of activity above a threshold. In another example, the processing module determines to not establish a new access policy when the access policy indicates that the slice(s) may transition from available to never available and the history of slice access sequences indicates that access activity is below a threshold. The method repeats to step 138 a new access policy is not going to be established.

When a new access policy is to be established, the method continues at step 142 where the processing module determines the timestamp of when the decision was made. At step 144, the processing module determines a new access policy based on one or more of an access policy reconsideration request (e.g., from a DS unit), a current access policy for the slice name(s), a command, a past history of access policy reconsiderations, a history of slice access sequences, a request, a predetermination, a data type, a security indicator, a priority indicator, a DSN memory system status indicator, a vault utilization indicator, and a DS managing unit message. In an example, the processing module determines the new access policy to extend the availability by one month when an access policy reconsideration request is received from a DS unit and the history of slice access sequences indicates a continued level of activity above a threshold. In another example, the processing module determines the new access policy to include user ID 457 to be authorized for access availability 24 hours a day for the next five months when a command is received from the DS managing unit. At step 146, the processing module sends the new access policy to the DS units that contain the slice(s) of the slice name(s) such that the DS units may store and utilize the new access policy.

FIGS. 10A-10C are schematic block diagrams of embodiments of a dispersed storage network (DSN) memory storage sets. As illustrated, FIGS. 10A-C represent DSN memory storage sets 148-152 (e.g., the set of DS units that store all the pillars of a common data segment) comprising six DS units 1-6. For example, pillar 1 slices are stored in DS unit 1, pillar 2 slices are stored in DS unit 2, pillar 3 slices are stored in DS unit 3, pillar 4 slices are stored in DS unit 4, pillar 5 slices are stored in DS unit 5, pillar 6 slices are stored in DS unit 6 when the operational parameters include a pillar width of n=6 and a read threshold of 4. As illustrated, FIGS. 10A-C indicate slice availability patterns in accordance with an access policy.

As illustrated, FIG. 10A indicates an access policy pattern from the hours of 12:00 AM to 6:00 AM, FIG. 10B illustrates an access policy pattern from the hours of 6:00 AM to 7:00 PM, and FIG. 10C illustrates an access policy pattern from the hours of 7:00 PM to 12:00 AM. Note that the access policy pattern may vary second by second, minute by minute, day by day, month-by-month, etc.

Based on these access policy patterns, DS units may read and/or write slices in vault 1 and/or vault 2 during the specified times of day when the particular vault does not include an X. For example, the pillar 2 for vault 1 is not available from 12:00 AM to 6:00 AM and the pillar 2 for vault 2 is available from 12:00 AM to 6:00 AM as illustrated by FIG. 10A.

Note that the access policy pattern may be utilized to impact data security and performance of the system. For example, the pattern may enable all of the pillars of a vault to be available in any one or more time frames to improve system performance. In another example, the pattern may enable just a read threshold of the pillars of a vault to be available in any one or more time frames to improve system security but maintain a moderate level of system performance (e.g., as long as those exact pillars remain active). In another example, the pattern may never enable a read threshold of the pillars of a vault to be available in any single time frame to improve system security. In that scenario the pattern may enable a read threshold of the pillars of a vault to be available across two or more time frames. As illustrated, vault 1 never has a read threshold (e.g., four pillars) number of pillars available in any one of the three time periods. For example, only pillars 4-6 are available for vault 1 from 12:00 AM to 6:00 AM, only pillars 1-3 are available for vault 1 from 6:00 AM to 7:00 PM, and only pillars 1, 5, 6 are available for vault 1 from 7:00 PM to 12:00 AM. As illustrated, the data segments may be retrieved from vault 1 by access vault 1 across two timeframes. For example, a DS processing unit may reconstruct a vault 1 data segment by retrieving slices of vault 1 from DS units 4-6 during the 12:00 AM-6:00 AM timeframe, followed by retrieving slices of vault 1 from any one or more of DS units 1-3 during the 6:00 AM-7:00 PM timeframe.

Figure 11:
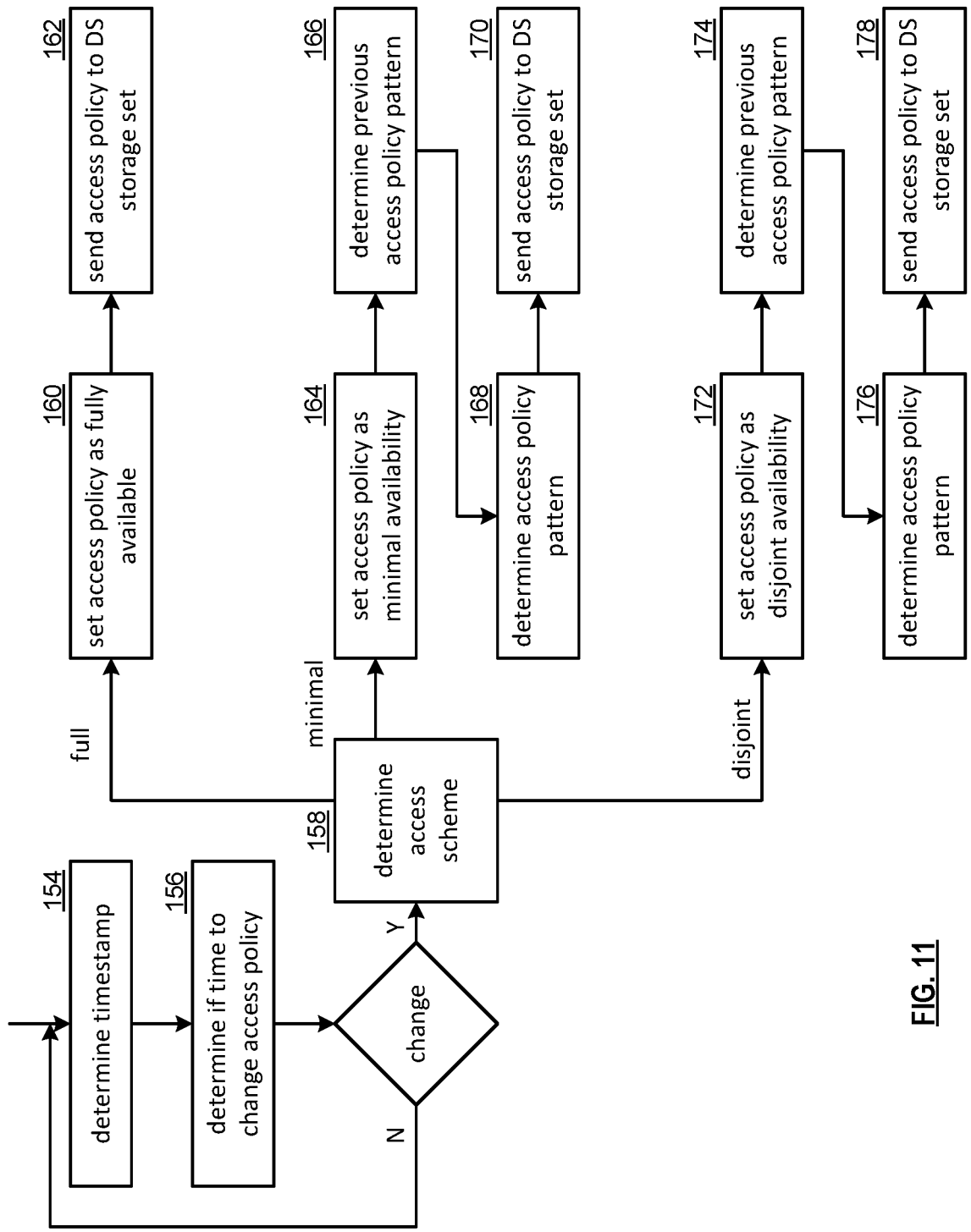
FIG. 11 is another flowchart illustrating another example of updating an access policy in accordance with the invention.

FIG. 11 is another flowchart illustrating another example of updating an access policy. The method begins with step 154 where a processing module (e.g., of one of a DS processing unit, a DS unit, a storage integrity processing unit, a DS managing unit and/or a user device) determines a timestamp of the current time. At step 156, the processing module determines whether it is time to change an access policy (e.g., who can access the slice and/or when the slice can be accessed) based on one or more of an access policy reconsideration request (e.g., from a DS unit), a current access policy, a command, a past history of access policy changes, a history of slice access sequences, a request, a predetermination, a data type, a security indicator, a priority indicator, a DSN memory system status indicator, a vault utilization indicator, and a DS managing unit message. In an example, the DS processing determines to change the access policy when an access policy reconsideration request is received from a DS unit and the history of slice access sequences indicates a continued level of activity above a threshold. In another example, the DS processing determines to change the access policy when the DSN memory system status indicator indicates that more security is desired. The method repeats to step 154 when the DS processing determines to not change the access policy.

When access policy is to be changed, the method continues at step 158 where the processing module determines an access scheme of the access policy where the access scheme includes one or more of a fully available scheme (e.g., all pillars available in at least one timeframe), a minimal available scheme (e.g., just a read threshold number of pillars are available in one or more timeframes), and a disjoint availability scheme (e.g., a read threshold number of pillars are available across two or more timeframes). Such a determination may be based on one or more of an access policy reconsideration request (e.g., from a DS unit), the current access policy, a command, a past history of access policy changes, a history of slice access sequences, a request, a predetermination, a data type, a security indicator, a priority indicator, a DSN memory system status indicator, a vault utilization indicator, and a DS managing unit message.

In an example, the processing module determines the access scheme to be fully available for the next timeframe when the performance indicator indicates a higher level of required performance and the security indicator indicates that a lower level of security is allowable. In another example, the processing module determines the access scheme to be minimally available when the security indicator indicates a higher level of required security and the performance indicator indicates that a lower level of performance is allowable. In yet another example, the processing module determines the access scheme to be disjoint availability when the security indicator indicates a much higher level of required security and the performance indicator indicates that a very low level of performance is allowable.

When the access scheme is to be fully available, the method continues at step 160 where the processing module sets the access policy as fully available for at least one timeframe. Note that the access policy pattern(s) may constrain availability of slices and/or vaults based on a function of time, user ID(s), system unit ID(s), and/or other factors (e.g., security priorities, performance priorities, etc.).

At step 162, the processing module sends the access policy to DS units of a DS unit storage set of the slices and/or vaults of the change such that the DS units may store and utilize the new access policy. Note that the DS processing may send the access policy at the start of a new timeframe transition or in advance of one or more timeframes where the access policy may include more than one access scheme of the access policy.

When the access scheme is to be minimally availability, the method continues at step 164 where the processing module sets the access policy as minimal availability for at least one timeframe. The method continues at step 166 where the processing module determines a previous access policy pattern (e.g., a lookup) to identify pillars that were unavailable and pillars that were available.

The method continues at step 168, the processing module determines the access policy pattern based on the previous access policy pattern to choose which pillars to make unavailable and which pillars to make available such that a read threshold number of pillars is available in any one timeframe. For example, the processing module changes the pattern of vault 2 from a read threshold of four available pillars (e.g., 2, 4-6) as illustrated in the timeframe of FIG. 10A to the pattern of vault 2 where the read threshold of four available pillars is different (e.g., 1-3, 6) as illustrated in the timeframe of FIG. 10B. The method continues at step 170 where the processing module sends the access policy to the DS units of a DS storage set of the slices and/or vaults of the change such that the DS units may store and utilize the new access policy. Note that the processing module may send the access policy at the start of a new timeframe transition or in advance of one or more timeframes where the access policy may include more than one access scheme of the access policy.

When the access scheme is to be disjointly availability, the method continues at step 172 where the processing module sets the access policy as disjoint availability for at least one timeframe. The method continues at step 174 where the processing module determines a previous access policy pattern (e.g., a lookup) to identify pillars that were unavailable and pillars that were available. The method continues at step 176 where the processing module determines the access policy pattern based on the previous access policy pattern to choose which pillars to make unavailable and which pillars to make available such that a read threshold of pillars is only available across two consecutive timeframes. For example, the processing module changes the pattern of vault 1 of only three available pillars (e.g., 1, 5, 6) as illustrated in the timeframe of FIG. 10C to the pattern of vault 2 of three available pillars (e.g., 4-6) as illustrated in the timeframe of FIG. 10A. The processing module may recreate a data segment from slices retrieved from the available vault 1 pillars in those two timeframes. Note that the processing module cannot recreate a data segment from slices retrieved from the available vault 1 pillars in just one those two timeframes since three pillars are available and the read threshold is four.

The method continues at step 178 where the processing module sends the access policy to the DS units of a DS storage set of the slices and/or vaults of the change such that the DS units may store and utilize the new access policy. Note that the processing module may send the access policy at the start of a new timeframe transition or in advance of one or more timeframes where the access policy may include more than one access scheme of the access policy.

Figure 12:
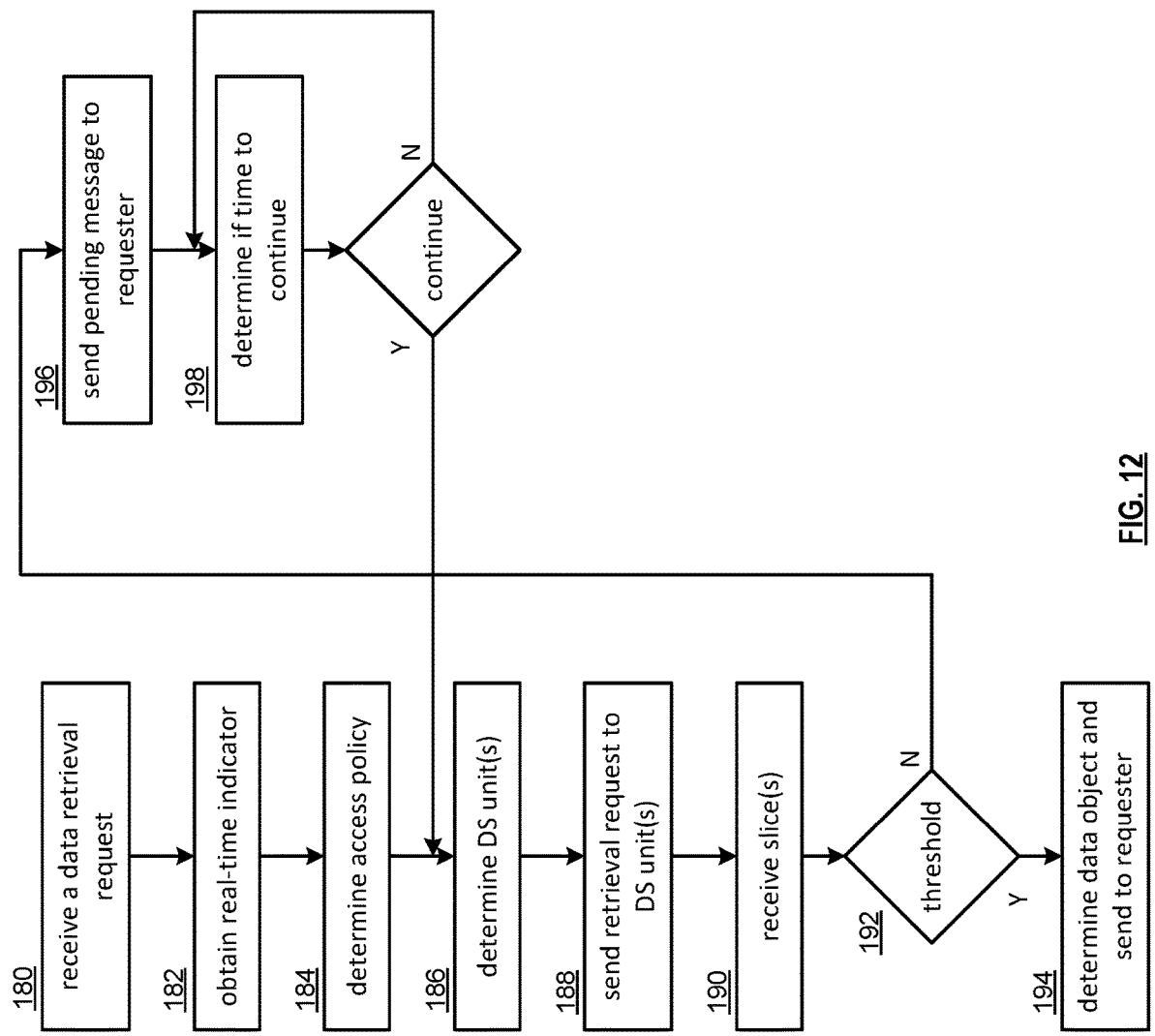
FIG. 12 is a flowchart illustrating an example of retrieving a data object in accordance with the invention.

FIG. 12 is a flowchart illustrating an example of retrieving a data object. The method begins with step 180 where a processing module receives a data retrieval request from a requester. The data retrieval request may be received from any one of a user device, a DS processing unit, a storage integrity processing unit, a DS managing unit, and another DS unit. The data retrieval request may include one or more of a data object name, a data segment identifier, a requester ID, a command, an access policy update, a data object ID, a source name, a data type, a data size indicator, a priority indicator, a security indicator, and a performance indicator. Note that the data retrieval request may be for a data object or for one or more data segments of a data object stored as encoded data slices in a dispersed storage network (DSN) memory.

At step 182, the processing module obtains a real-time indicator corresponding to when the data retrieval request was received (e.g., a system clock time). At step 184, the processing module determines a time-based data access policy based on the data retrieval request and the real-time indicator. Such a determination may be based on one or more of a previous time-based data access policy, a policy schedule, a data identifier, the real-time indicator, a requester identifier, a data type, a priority indicator, a security indicator, and a dispersed storage network (DSN) status indicator. For example, the processing module determines the time-based data access policy based on a stored access policy for the data object name. Note that the processing module may adjust the time-based data access policy based on priority of device issuing the data retrieval request. For example, the processing module determines the priority of device based on a vault look up or by extracting the priority of device from the data retrieval request. Alternatively, the processing module may extract the time-based data access policy from the data retrieval request when priority of device issuing the data retrieval request is at a first priority level (e.g., a required predefined priority level).

At step 186, the processing module accesses a plurality of dispersed storage (DS) units in accordance with the time-based data access policy to retrieve encoded data slices. The processing module identifies a first set of DS units of the plurality of DS units that are accessible during a first time interval in accordance with the time-based data access policy. In addition, or in a subsequent step, the processing module may identify a second set of DS units of the plurality of DS units that are accessible during a second time interval in accordance with the time-based data access policy. Note that the number of DS units in each of the first and second sets of DS units is less than the threshold number of encoded data slices.

At step 188, the processing module sends slice retrieval messages to the DS units. In an example, the processing module sends slice retrieval messages only to the DS units that are known to be available now (e.g., the first set of DS units), even if the number of pillars is below the read threshold. In another example, the processing module sends slice retrieval messages to the DS units storing the pillars of the encoded data slices even if some of the pillars are known to be currently unavailable. The DS units may queue the retrieval request for subsequent processing when the vault becomes available in accordance with the time-based access data policy. Alternatively, the DS units may respond with a denial message and not queue the request.

At step 190, the processing module receives slices from the DS units. At step 192, the processing module determines whether a threshold number of slices have been received (e.g., based on counting them and comparing them to the threshold of the operational parameters). Note that the processing module may send an error message to the DS managing unit when a slice is not received within a receive time period from a DS unit that was sent a retrieval request.

When at least a threshold number of slices have been received, the method continues at step 194 where the processing module decodes the threshold number of encoded data slices in accordance with an error coding dispersal storage function when a threshold number of the encoded data slices have been retrieved. The processing module aggregates all the data segments to recreate the data object when the processing module retrieves more than one data segment. The processing module sends the data to the requester.

The method continues at step 196 where the processing module generates a retrieval status message in accordance with the time-based data access policy when the threshold number of the encoded data slices has not been retrieved. The retrieval status message may include one or more of the data object name, the data segment ID, an indicator of the amount of the data object retrieved so far, an indicator of the amount of the data object pending retrieval, and an estimated timeframe of when the data object will be fully retrieved. For example, the processing module sends the retrieval status message to the requester. In another example, the processing module sends the retrieval status message to the requester for each time the method passed through this step (e.g., each time the processing module waits to retrieve another group of slices).

The method continues at step 198 wherein the processing module determines whether it is time to continue to retrieve slices based on one or more of the time-based data access policy, an access policy pattern, which pillars have been tried so far, which pillars are still required, and the current real-time indicator. For example, the processing module determines that it is not time to continue to retrieve slices when no access policy pattern transitions have occurred and more pillars are required (e.g., no new pillars are available yet). The method repeats at step 198 when it is not time to continue to retrieve slices and branches to step 186 when it is time to continue retrieving slices (e.g., try new pillars when a timeframe transition has occurred making more pillars available).

In a data storage example of operation, a processing module receives a data write request from a requesting device, wherein the data write request includes data. The processing module encodes the data into a set of encoded data slices in accordance with an error coding dispersal storage function. Next, the processing module identifies a set of dispersed storage (DS) units and a time-based data access policy based on a privilege set of the requesting device. For example, the processing module identifies the set of DS units based on the privilege set of the requesting device and generates the time-based data access policy based on the set of DS units. In another example, the processing module identifies the time-based data access policy based on the privilege set of the requesting device and generates the set of DS units based on the time-based data access policy. As yet another example, the processing module identifies the set of DS units and the time-based data access policy by obtaining a real-time indicator corresponding to when the data write request was received and identifying the set of DS units and the time-based data access policy based on the real-time indicator. As a further example, the processing module identifies the set of DS units and the time-based data access policy by extracting the identifying the set of DS units and the time-based data access policy from the data write request when priority of the requesting device is at a first priority level. After identifying the DS units, the processing module outputs the set of encoded data slices to the set of DS units in accordance with the time-based data access policy.

Figure 13:
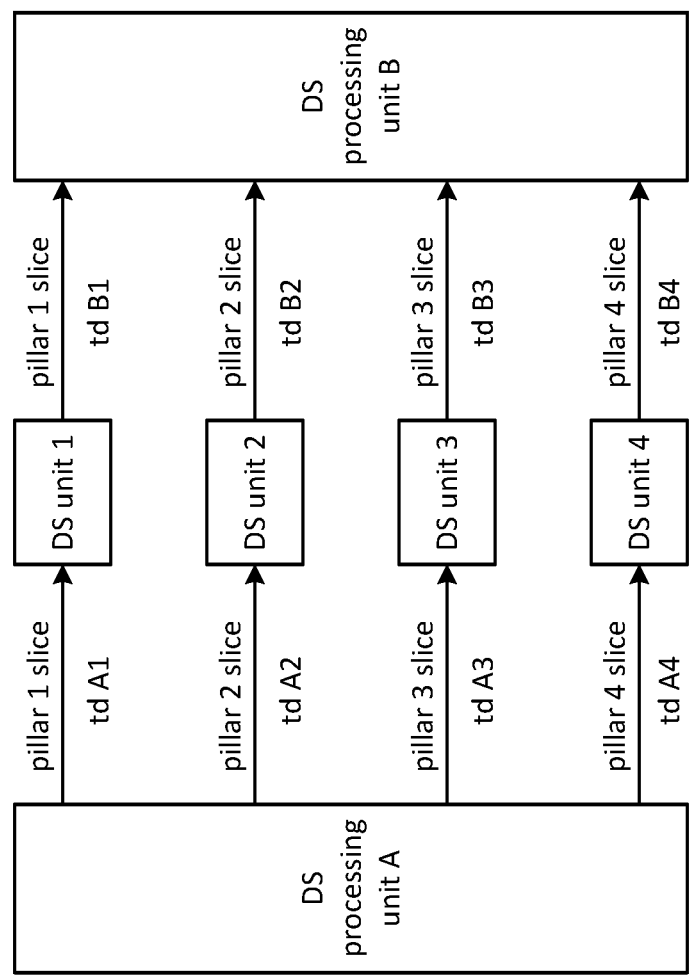
FIG. 13 is a schematic block diagram of another embodiment of a computing system in accordance with the invention.

FIG. 13 is a schematic block diagram of another embodiment of a computing system that includes a DS processing unit A, a plurality of DS units 1-4, and a DS processing unit B. Each of DS processing units A and B may be coupled to the plurality of DS units 1-4 via the network resulting in unique time delay values between DS processing units A and/or B and the plurality of DS units 1-4.

In an example of data storage, DS processing unit A encodes a data segment (e.g., a portion of data) in accordance with an error coding dispersed storage function to produce a pillar 1 slice, a pillar 2 slice, a pillar 3 slice, and a pillar 4 slice. DS processing unit A determines time delays to send information to each of the plurality of DS units 1-4 based on one or more of a real time query (e.g., a ping), a lookup, a message, a vault value, a command, a message from the DS managing unit, and a predetermination. For example the DS processing unit A determines a first time delay between itself and DS unit 1 (td A1), a second time delay between itself and DS unit 2 (td A2), a third time delay between itself and DS unit 3 (td A3), and a fourth time delay between itself and DS unit 4 (td A4).

The DS processing unit A then determines the DS having the longest time delay (td long) and determines an availability delay (ad) number for each of the DS units based on the longest time delay and a time delay of a path to the DS unit as: ad=td long−td. For example, the availability delay for the path from the DS processing unit A to the DS unit 1 is availability delay A1 (ad A1). Note that the availability delay for the path with the longest delay is 0.

In another example of operation, DS processing unit A determines a read threshold number of DS units of the plurality of DS units that have shortest time delays. Next, DS processing unit A determines a DS unit with the longest time delay (td long) of a subset of DS units that were determined to have the shortest time delays. The DS processing unit A determines an availability delay (ad) number for each DS unit of a subset of DS units that were determined to have the shortest time delays based on the longest time delay value and the time delay of the path to the DS unit as: ad=td long−td. The DS processing unit A determines the availability delay to be zero for remaining DS units outside of the subset of DS units that were determined to have the shortest time delays. For example, the availability delay for the path from the DS processing unit A to the DS unit 3 is availability delay A3 (ad A3). Note that the availability delay for the path of the subset with the longest delay is 0.

Next, the DS processing unit A sends each pillar slice and corresponding availability delay to the corresponding DS unit at substantially the same time. For example, DS processing unit A sends pillar 1 slice and ad A1 to DS unit 1, DS processing unit A sends pillar 2 slice and ad A2 to DS unit 2, DS processing unit A sends pillar 3 slice and ad A3 to DS unit 3, and DS processing unit A sends pillar 4 slice and ad A4 to DS unit 4. The DS unit receives the pillar slice and corresponding availability delay from DS processing unit A. The DS unit stores the slice in memory and establishes a slice status as unavailable and/or pending availability (e.g., marks a table in memory that the slice is not retrieval yet). Note that any retrieval attempts at this moment will not result in the immediate slice retrieval. The DS unit starts a timer with the value of the availability delay. The DS unit changes the slice status to available such that the slice may be successfully retrieved when the timer has expired. For example, DS unit 2 receives pillar 2 slice and availability delay ad A2 from DS processing unit A. DS unit 2 stores the pillar 2 slice, marks the status as unavailable, and starts a timer with the value ad A2. DS unit 2 changes the pillar 2 slice status to available when the timer expires. The DS unit 2 may retrieve the pillar 2 slice based on a retrieval request.

The slices of all of the pillars become available as a function of the delays. In an instance, the slices of all of the pillars become available at substantially the same time. In another instance, a read threshold slices of the DS units with the shortest time delays become available at substantially the same time. An example timing diagram is discussed with reference to FIG. 14.

In another example of operation, the method enables retrieved slices from the plurality of DS units to arrive substantially at the same time at DS processing unit B in response to a retrieval request from DS processing unit B. DS processing unit B determines time delays to retrieve information between the each of the plurality of DS units 1-4 and DS processing unit B. DS processing unit B and the plurality of DS units 1-4 may be operably coupled via the network resulting in unique time delay values between the plurality of DS units 1-4 and DS processing unit B. The time delay determination may be based on one or more of a real time query (e.g., a ping), a lookup, a message, a vault value, a command, a message from the DS managing unit, and a predetermination. The DS processing unit B determines a time delay between the DS unit 1 and DS processing unit B as time delay B1 (td B1), a time delay between the DS unit 2 and DS processing unit B as time delay B2 (td B2), a time delay between the DS unit 3 and DS processing unit B as time delay B3 (td B3), and a time delay between the DS unit 4 and DS processing unit B as time delay B4 (td B4).

In an example, DS processing unit B determines a DS unit of the plurality of DS units with a longest time delay (td long). The DS processing unit B determines a send delay (sd) number for each DS unit based on the longest time delay and the time delay of the path from the DS unit as: sd=td long−td. For example, the send delay for the path from the DS unit 1 to DS processing unit B is send delay B1 (sd B1). Note that the send delay for the path with the longest delay is 0. In another instance, the DS processing B may determine each send delay as sd=2*td long−2*td to account for the delay in sending the retrieval request to the DS unit.

In another example, DS processing unit B determines a read threshold number of DS units of the plurality of DS units that have the shortest time delays. Next, DS processing unit B determines a DS unit with the longest time delay (td long) of a subset of DS units that were determined to have the shortest time delays. The DS processing unit B determines a send delay (sd) number for each DS unit of the subset of DS units that were determined to have the shortest time delays based on the longest time delay value and the time delay of the path from the DS unit as: sd=td long−td. The DS processing unit B determines the send delay to be zero for the remaining DS units outside of the subset of DS units that were determined to have the shortest time delays. For example, the send delay for the path from the DS unit 3 to the DS processing unit B is send delay B3 (sd B3). Note that the availability delay for the path of the subset with the longest delay is 0. In another instance, the DS processing B may determine each send delay as sd=2*td long−2*td to account for the delay in sending the retrieval request to the DS unit.

In the next step, the DS processing unit B sends each DS unit a retrieval request for the pillar slices and corresponding send delay at substantially the same time. For example, DS processing unit B sends a retrieval request for pillar 1 slice and sd B1 to DS unit 1, DS processing unit B sends a retrieval request for pillar 2 slice and sd B2 to DS unit 2, DS processing unit B sends a retrieval request for pillar 3 slice and sd B3 to DS unit 3, and DS processing unit B sends a retrieval request for pillar 4 slice and sd B4 to DS unit 4.

The DS unit receives the pillar slice retrieval request and corresponding send delay from DS processing unit B. The DS unit starts a timer with the value of the send delay. The DS unit may retrieve the pillar slice from memory and cache it. The DS unit sends the pillar slice from the cache to DS processing unit B when the timer has expired. For example, DS unit 2 receives a pillar 2 slice retrieval request and send delay sd B2 from DS processing unit B. DS unit 2 starts a timer with the value sd B2. DS unit 2 retrieves the pillar 2 slice and sends it to DS processing unit B when the timer expires.

Note that in an example of operation slices of all of the pillars arrive at the requesting DS processing unit B at substantially the same time. In another example, a read threshold slices of the DS units with the shortest time delays arrive at the requesting DS processing unit B at substantially the same time. Note that uniform availability of distributedly stored information may be desirable when the information is of a time sensitive nature such as financial transactions (e.g., market arbitrage). An example timing diagram is discussed with reference to FIG. 15.

Figure 14:
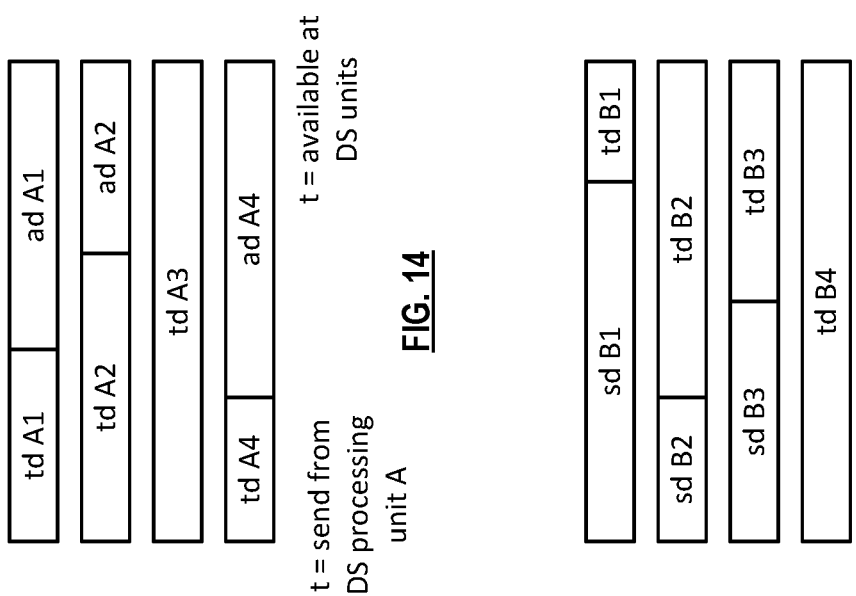
FIG. 14 is a timing diagram of an example storage sequence in accordance with the invention.

FIG. 14 is a timing diagram of an example storage sequence. As illustrated, the left edge of the timing diagram illustrates the time when the plurality of slices are sent from the dispersed storage (DS) processing at substantially the same time (e.g., t=send from DS processing unit A). The time delays from the DS processing unit to each DS unit of a plurality of DS units is illustrated by td A1, td A2, td A3, and td A4. The DS units receive the slice at the end of the time delay and start the availability delay timers ad A1, ad A2, ad A3, and ad A4. Note that the availability delay for the third path ad A3=0 since td A3 is the longest of the time delay values. The DS units change the slice status to available at substantially the same time when the timers expire (e.g., t=available at DS units).

Figure 15:
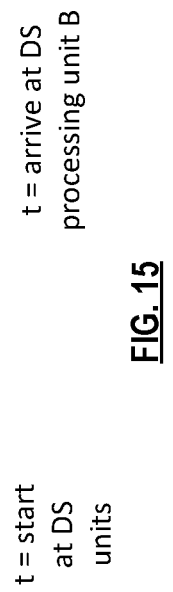
FIG. 15 is a timing diagram of an example retrieval sequence in accordance with the invention.

FIG. 15 is a timing diagram of an example retrieval sequence. As illustrated, the left edge of the timing diagram illustrates the time when the plurality of dispersed storage (DS) units start a unique send delay timer sd B1, sd B2, sd B3, and sd B4 upon receiving a retrieval request (e.g., t=start at DS units). Note that the send delay for the fourth path sd B4=0 since td B4 is the longest of the time delay values. The DS units send their slice to the DS processing unit B when the timer expires. Note that the slices are sent from the DS units at different times. The time delays from each of the DS units to the DS processing unit B is illustrated by td B1, td B2, td B3, and td B4. The slices arrive at the DS processing unit B at substantially the same time (e.g., t=arrive at DS processing unit B).

FIG. 16 is a flowchart illustrating an example of storing a data object. The method begins with step 200 where a processing module receives a store request and a data object to store from any one of a user device, a DS processing unit, a storage integrity processing unit, a DS managing unit, and another DS unit. The request may include a command, a user ID, a data object name, a data type, a data size, a priority indicator, a security indicator, a performance indicator, operational parameters, time delay to DS units information, and other metadata pertaining to the data object.

At step 202, the processing module determines operational parameters and a plurality of DS units of a DSN memory storage set based on one or more of vault information, a predetermination, a command, the user ID, the data object name, the data type, the data size, the priority indicator, the security indicator, the performance indicator, the time delay to DS units information, and the other metadata.

At step 204, the processing module determines time delays to send information between the DS processing and each of the plurality of DS units. Such a determination may be based on one or more of a real time query (e.g., a ping), a lookup, a message, a vault value, a command, a message from the DS managing unit, and a predetermination. At step 206, the DS processing determines availability delays for each DS processing of the plurality of DS units. Such a determination may be based on one or more of the time delays, the operational parameters, a message, a vault value, a command, a message from the DS managing unit, and a predetermination. In an example, the processing module determines the availability delay based on a DS unit with a longest time delay as previously discussed. In another example, the processing module determines the availability delay based on a DS unit with a longest time delay of a read threshold subset of the plurality of DS units with shortest time delays as previously discussed.

At step 208, the processing module encodes the data object utilizing an error coded dispersal stored function and in accordance with the operational parameters to produce encoded data slices. The processing module then sends the encoded data slices and corresponding availability delays to the plurality of DS units at substantially the same time.

FIG. 17 is another flowchart illustrating another example of retrieving encoded data slices. The method begins at step 212 where a processing module (e.g., of a DS unit) receives a slice retrieval request from a requester (e.g., any one of a user device, a DS processing unit, a storage integrity processing unit, a DS managing unit, and a DS unit) to retrieve a slice. The request may include one or more of slice name(s), a requester ID, a command, an access policy update, a send delay, a data object ID, a source name, a data type, a data size indicator, a priority indicator, a security indicator, and a performance indicator.

At step 214, the processing module determines an access policy to apply to the retrieval request based on one or more of a lookup in memory of previously received access policy, the slice name(s), the requester ID, a command, an access policy update, a data object ID, a source name, a data type, a data size indicator, a priority indicator, a security indicator, and a performance indicator. For example, the processing module determines the access policy based on the stored access policy for the slice names. At step 216, the processing module determines a timestamp.

At step 218, the processing module retrieves the slice from memory. At step 220, the processing module determines a send delay based on one or more of a send delay received with the slice retrieval request, a query, the access policy, the timestamp, a memory status indicator, a DS unit status indicator, and a performance indicator. In an example, the processing module utilizes the received send delay value as the send delay. In another example, the processing module queries each of the other DS units of the storage set to determine the time delay from each of the other DS units to retrieval requester. The processing module determines the send delay based on the determined time delays as previously discussed.

At step 222, the processing module starts a timer based on the value of the send delay. The processing module determines whether it is time to send the slice to the requester based of the timer (e.g., the timer expires). When it is time to send, the method continues at step 226 where the processing module sends the retrieved slice to the requester such that a plurality of slices from a DS unit associated with the processing module and other DS units of a same DS unit storage set (e.g., the other pillars) for the same data segment substantially arrive at the requester at the same time.

Figure 18:
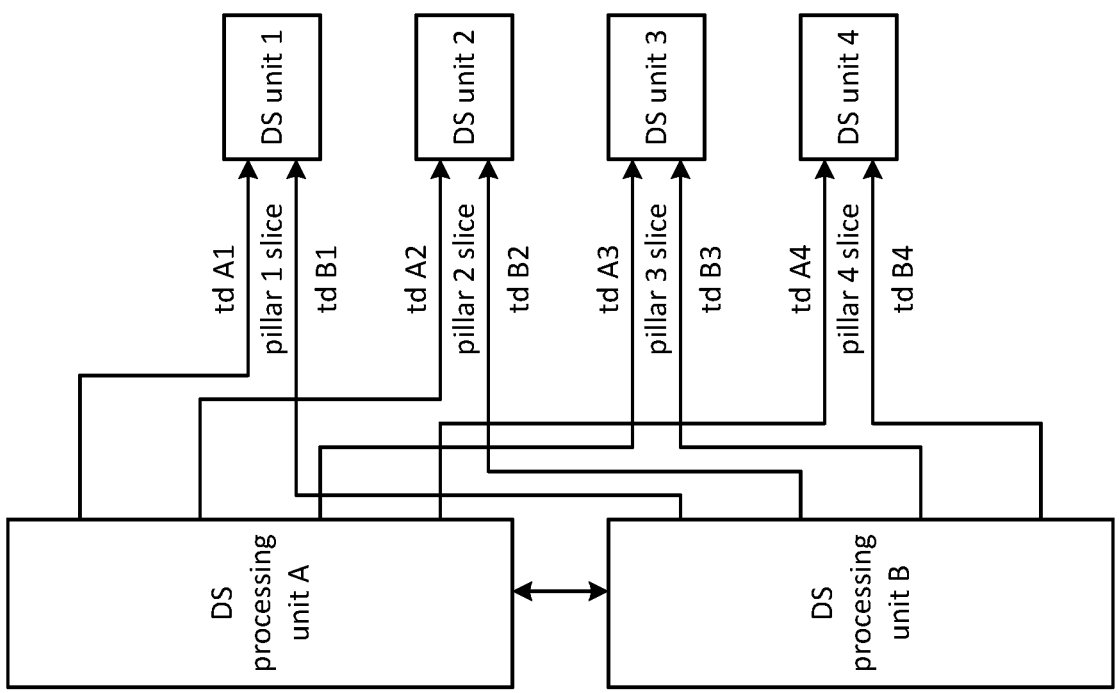
FIG. 18 is a schematic block diagram of another embodiment of a computing system in accordance with the invention.

FIG. 18 is a schematic block diagram of another embodiment of a computing system that includes a DS processing unit A, a DS processing unit B, and a plurality of DS units 1-4. In such a system, two or more DS processing units send EC data slices of two or more data objects to the same set of DS units such that the data objects are substantially received by the DS units at the same time. Note that uniform availability of distributedly stored information may be desirable when the information is of a time sensitive nature such as financial transactions (e.g., market arbitrage). For example, two or more DS processing units may place market orders with a clearing house by sending the orders to the same clearing house such that the orders arrive at substantially the same time.

In an example of operation, DS processing unit A encodes a data segment utilizing an error coded dispersal storage function to produce a pillar 1 slice, a pillar 2 slice, a pillar 3 slice, and a pillar 4 slice. DS processing unit A determines time delays to send information between DS processing unit A and each of the plurality of DS units 1-4. DS processing unit A and the plurality of DS units 1-4 may be operably coupled via a network resulting in unique time delay values between DS processing unit A and the plurality of DS units 1-4. The time delay determination may be based on one or more of a real time query (e.g., a ping), a lookup, a message, a vault value, a command, a message from the DS managing unit, and/or a predetermination. The DS processing unit A determines a time delay between the DS processing unit A and DS unit 1 as time delay A1 (td A1), a time delay between the DS processing unit A and DS unit 2 as time delay A2 (td A2), a time delay between the DS processing unit A and DS unit 3 as time delay A3 (td A3), and a time delay between the DS processing unit A and DS unit 4 as time delay A4 (td A4).

DS processing unit B encodes a data segment in accordance with the error coded dispersal stored function to produce a pillar 1 slice, a pillar 2 slice, a pillar 3 slice, and a pillar 4 slice. DS processing unit B determines time delays to send information between DS processing unit B and each of the plurality of DS units 1-4. DS processing unit B and the plurality of DS units 1-4 may be operably coupled via the network resulting in unique time delay values between DS processing unit B and the plurality of DS units 1-4. The time delay determination may be based on one or more of a real time query (e.g., a ping), a lookup, a message, a vault value, a command, a message from the DS managing unit, and a predetermination. The DS processing unit B determines a time delay between the DS processing unit B and DS unit 1 as time delay B1 (td B1), a time delay between the DS processing unit B and DS unit 2 as time delay B2 (td B2), a time delay between the DS processing unit B and DS unit 3 as time delay B3 (td B3), and a time delay between the DS processing unit B and DS unit 4 as time delay B4 (td B4).

The DS processing unit A and DS processing unit B share time delay information such that DS processing unit A determines td B1, td B2, td, B3, and td B4 and DS processing unit B determines td A1, td A2, td, A3, and td A4. In an example, the DS processing units A and B share the time delay information via a link between them. In another example, the DS processing units A and B share the time delay information via passing the time delay information through one or more of the DS units 1-4.

In an example of operation, the DS processing unit A and/or B determines the DS unit and path of the plurality of DS unit 1-4 with a longest time delay (td long) of all the time delays td A1-td A4 and td B1-td B4. The DS processing unit A and/or B determines a send delay (sd) number for each DS processing A and B to each DS unit based on the longest time delay and the time delay of the path to the DS unit as: sd=td long–td. For example, the send delay for the path from the DS processing unit B to the DS unit 1 is send delay B1 (sd B1). Note that the send delay for the one path of eight with the longest delay is 0.

In another example, the DS processing unit A and/or B determines a read threshold number of DS units from the perspective of each of the DS processing units A and B of the plurality of the DS units that have shortest time delays (e.g., two paths). Next, the DS processing unit A and/or B determines the DS unit path with the longest time delay (td long) of a subset of DS units that were determined to have the shortest time delays. The DS processing unit A and/or B determines a send delay (sd) number for each DS unit of the subset of DS units that were determined to have the shortest time delays based on the longest time delay value and the time delay of the path to the DS unit as: sd=td long–td. The DS processing unit A and/or B determines the send delay to be zero for the remaining DS units outside of the subset of DS units that were determined to have the shortest time delays. For example, the send delay for the path from the DS processing unit A to the DS unit 3 is send delay A3 (sd A3). Note that the send delay for the path of the subset with the longest delay is 0.

In the next step, the DS processing units A and B start send delay timers for each of the values of the determined sends delays at substantially the same time. The DS processing units A and B send slices for a pillar to the DS unit when the corresponding send timer expires. For example, DS processing unit A sends pillar 1 slice to DS unit 1 when send timer sd A1 expires. In another example, DS processing unit B sends pillar 3 slice to DS unit 3 when send timer sd B3 expires, etc.

The DS unit receives the pillar slice from DS processing unit A and B such that the data objects sent from DS processing units A and B are stored in the DS units substantially at the same time. Note that in an embodiment the slices of all of the pillars from both DS processing units A and B become available at substantially the same time. In another embodiment a read threshold slices for both data objects of the DS units with the shortest time delays become available at substantially the same time. An example timing diagram is discussed with reference to FIG. 19.

Figure 19:
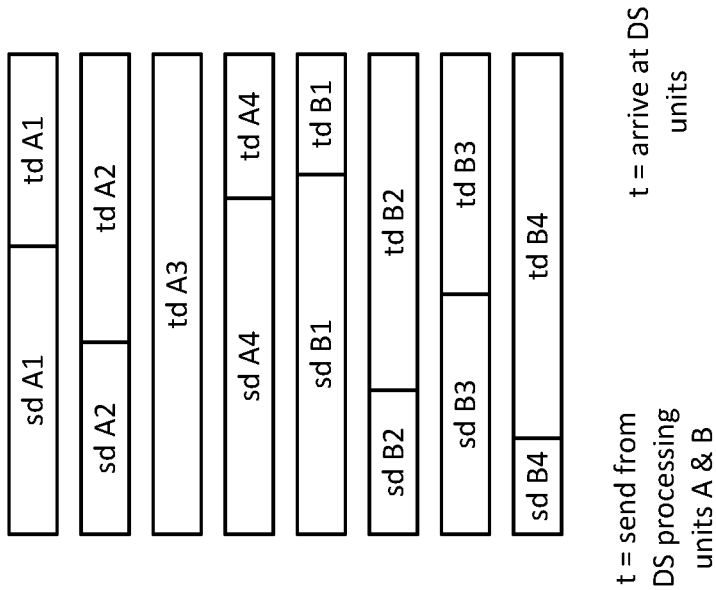
FIG. 19 is another timing diagram of another example storage sequence in accordance with the invention.

FIG. 19 is another timing diagram of another example storage sequence. As illustrated, the timing diagram illustrates the timing of two dispersed storage (DS) processing units storing slices to a plurality of common DS units where the slices from the two DS processing units arrive at the common DS units at substantially the same time.

As illustrated, the left edge of the timing diagram illustrates the time when the DS processing units A and B start a unique send delay timer sd A1, sd A2, sd A3, sd A4, sd B1, sd B2, sd B3, and sd B4 upon starting a coordinated store sequence (e.g., t=send from DS processing units A and B). Note that the send delay for the third path sd A3=0 since td A3 is the longest of the time delay values. The DS processing units A and B send their slice to the DS units when each of the send timers expires. Note that the slices are sent from the DS processing units at different times. The time delays from the DS processing units A and B to each of the DS units 1-4 is illustrated by td A1, td A2, td A3, td A4, td B1, td B2, td B3, and td B4. The slices arrive at the common DS units at substantially the same time (e.g., t=arrive at DS units).

Figure 20:
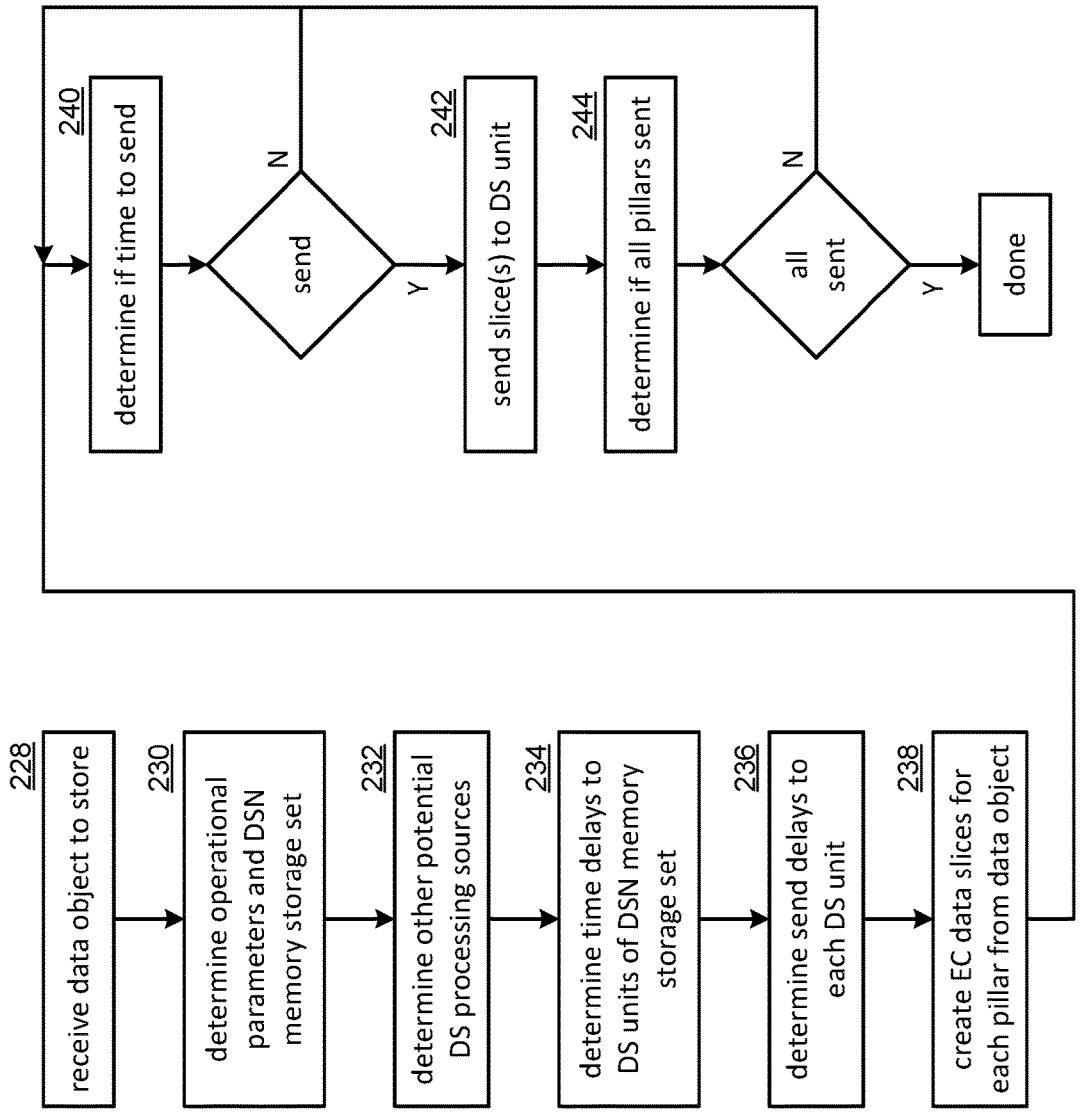
FIG. 20 is a flowchart illustrating an example of outputting slices in accordance with the invention.

FIG. 20 is a flowchart illustrating an example of outputting slices. The method begins with step 228 where a processing module receives a store request and a data object to store from any one of a user device, a DS processing unit, a storage integrity processing unit, a DS managing unit, and another DS unit. The request may include a command, a user ID, a data object name, a data type, a data size, a priority indicator, a security indicator, a performance indicator, operational parameters, time delay to DS units information, and/or other metadata pertaining to the data object.

At step 230, the processing module determines operational parameters and a plurality of DS units of a DSN memory storage set based on one or more of vault information, a predetermination, a command, the user ID, the data object name, the data type, the data size, the priority indicator, the security indicator, the performance indicator, the time delay to DS units information, and the other metadata.

At step 232, the processing module determines other potential DS processing sources that may send slices to the same common set of DS units in accordance with a time-coordinated approach based on one or more of a query, a schedule, vault information, a predetermination, a command, the user ID, the data object name, the data type, the data size, the priority indicator, the security indicator, the performance indicator, the time delay to DS units information, and the other metadata. For example, a processing module of a DS processing unit A may determine that a DS processing unit B is another DS processing source by querying DS processing unit B and receives an affirmative query response.

At step 234, the processing module determines time delays to send information between the DS processing and each of the plurality of DS units. Such a determination may be based on one or more of a real time query of the plurality of DS units (e.g., a ping), a query of the other DS processing source(s), shared information between DS processing units, a lookup, a message, a vault value, a command, a message from the DS managing unit, and a predetermination.

At step 236, the processing module determines "send-delays" for each DS unit of the plurality of DS units. Such a determination may be based on one or more of the time delays, the operational parameters, a message, a vault value, a command, a message from the DS managing unit, and a predetermination. In an example, the DS processing unit determines the send-delay based on a DS unit with a longest time delay as previously discussed. In another example, the DS processing unit determines the send-delay based on a DS unit with a longest time delay of a read threshold subset (e.g., including all DS unit storage sets from the DS processing sources) of the plurality of DS units with the shortest time delays as previously discussed.

At step 238, the processing module encodes the data object utilizing an error coding dispersal storage function to produce encoded data slices for each pillar. The DS processing starts a timer for each DS unit path based on the value of the send delay. At step 240, the processing module determines whether it is time to send the slice to the DS unit based on the timer. For example, the processing module determines that it is time to send when the timer expires. The method repeats at step 240 when the DS processing determines that it is not time to send.

When it is time to send, the method continues at step 242 where the processing module sends the pillar slices in accordance with the timer expiration to the corresponding DS unit. At step 244, the processing module determines whether slices of all the pillars have been sent to the DS units based on which pillars of encoded data slices were created and which pillars of encoded data slices have been sent so far. Note that the created pillars may be less than the pillar width n. The method repeats at step 240 when all the pillars have not been sent and ends when they have been.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A method for execution by a processing system of a storage network, the method comprises:
    generating encoded data slices based on a dispersed error encoding of a data object;
    associating an access policy with a set of storage units of the storage network to store the data object, wherein the access policy includes time varying accessibility patterns that differ for differing ones of the set of storage units of the storage network;
    determining a timestamp;
    storing the encoded data slices of the data object, an indicator of the time stamp and an indicator of the access policy, wherein the encoded data slices of the data object are stored among differing ones of the set of storage units of the storage network having the time varying accessibility patterns that differ for the differing ones of the set of storage units of the storage network;
    receiving an access request associated with the data object; and
    retrieving a read threshold number of the encoded data slices associated with the data object from two or more of the differing ones of the set of storage units of the storage network in accordance with the time varying accessibility patterns that differ for the differing ones of the set of storage units of the storage network.

2. The method of claim 1, wherein the dispersed error encoding utilizes a forward error correction.

3. The method of claim 1, wherein the dispersed error encoding utilizes a Reed-Solomon encoding.

4. The method of claim 1, wherein the access policy is associated with access authorization for the encoded data slices.

5. The method of claim 1, further comprising:
    receiving an access request associated with the object;
    determining, based on the access policy, when the access request is authorized; and
    fulfilling the access request when the access request is authorized.

6. The method of claim 5, wherein fulfilling the access request includes retrieving a threshold number of the encoded data slices from the storage unit.

7. The method of claim 5, wherein fulfilling the access request includes generating the data object based on a decoding of a threshold number of the encoded data slices.

8. The method of claim 5, wherein fulfilling the access request includes sending the data object to a device that originated the access request.

9. The method of claim 1, further comprising:
    receiving an access request associated with the object;
    determining, based on the access policy, when the access request is not authorized; and
    not fulfilling the access request when the access request is not authorized.

10. The method of claim 9, wherein not fulfilling the access request includes sending a message to a device that originated the access request.

11. A processing system of a storage network comprises:
    at least one memory that stores operational instructions; and
    at least one processor that, in response to executing the operational instructions, performs operations that include:
        generating encoded data slices based on a dispersed error encoding of a data object;
        associating an access policy with a set of storage units of the storage network to store the data object, wherein the access policy includes time varying accessibility patterns that differ for differing ones of the set of storage units of the storage network;
        determining a timestamp; and
        storing the encoded data slices of the data object, an indicator of the time stamp and an indicator of the access policy, wherein the encoded data slices of the data object are stored among differing ones of the set of storage units of the storage network having the time varying accessibility patterns that differ for the differing ones of the set of storage units of the storage network;
        receiving an access request associated with the data object; and
        retrieving a read threshold number of the encoded data slices associated with the data object from two or more of the differing ones of the set of storage units of the storage network in accordance with the time varying accessibility patterns that differ for the differing ones of the set of storage units of the storage network.

12. The processing system of claim 11, wherein the dispersed error encoding utilizes a forward error correction.

13. The processing system of claim 11, wherein the dispersed error encoding utilizes a Reed-Solomon encoding.

14. The processing system of claim 11, wherein the access policy is associated with access authorization for the encoded data slices.

15. The processing system of claim 11, wherein the operations further include:
    receiving an access request associated with the data object;
    determining, based on the access policy, when the access request is authorized; and
    fulfilling the access request when the access request is authorized.

16. The processing system of claim 15, wherein fulfilling the access request includes retrieving a threshold number of the encoded data slices from the storage unit.

17. The processing system of claim 15, wherein fulfilling the access request includes generating the data object based on a decoding of a threshold number of the encoded data slices.

18. The processing system of claim 15, wherein fulfilling the access request includes sending the data object to a device that originated the access request.

19. The processing system of claim 11, wherein the operations further include:
    receiving an access request associated with the data object;
    determining, based on the access policy, when the access request is not authorized; and
    not fulfilling the access request when the access request is not authorized.

20. The processing system of claim 19, wherein not fulfilling the access request includes sending a message to a device that originated the access request.

* * * * *